US 9,137,652 B2

(12) United States Patent
Zhou et al.

(10) Patent No.: US 9,137,652 B2
(45) Date of Patent: Sep. 15, 2015

(54) METHOD FOR IMPLEMENTING POLICY AND CHARGING CONTROL IN A ROAMING SCENE

(75) Inventors: Xiaoyun Zhou, Shenzhen (CN); Zaifeng Zong, Shenzhen (CN); Tong Rui, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/257,806

(22) PCT Filed: Dec. 3, 2009

(86) PCT No.: PCT/CN2009/075295
§ 371 (c)(1),
(2), (4) Date: Sep. 20, 2011

(87) PCT Pub. No.: WO2011/011942
PCT Pub. Date: Feb. 3, 2011

(65) Prior Publication Data
US 2012/0124220 A1    May 17, 2012

(51) Int. Cl.
*G06F 15/16* (2006.01)
*H04W 4/24* (2009.01)
*H04M 15/00* (2006.01)

(52) U.S. Cl.
CPC ............. *H04W 4/24* (2013.01); *H04M 15/00* (2013.01); *H04M 15/66* (2013.01); *H04M 15/8038* (2013.01); *H04M 2215/7442* (2013.01)

(58) Field of Classification Search
CPC ....................................................... G06F 15/16
USPC ................................................. 709/227–229
See application file for complete search history.

(56) References Cited

U.S. PATENT DOCUMENTS

| 2010/0075692 | A1* | 3/2010 | Busschbach et al. ...... 455/452.2 |
| 2010/0150003 | A1* | 6/2010 | Andreasen et al. ........... 370/252 |
| 2011/0161504 | A1* | 6/2011 | Zhou et al. .................... 709/227 |
| 2011/0173332 | A1* | 7/2011 | Li et al. ......................... 709/227 |

FOREIGN PATENT DOCUMENTS

| CN | 1988722 A | 6/2007 |
| CN | 101047989 A | 10/2007 |
| CN | 101286915 A | 10/2008 |
| CN | 101447918 A | 6/2009 |

OTHER PUBLICATIONS

International Search Report for PCT/CN2009/075295 dated Apr. 23, 2010.

* cited by examiner

*Primary Examiner* — Vivek Srivastava
*Assistant Examiner* — Sibte Bukhari
(74) *Attorney, Agent, or Firm* — Ling Wu; Stephen Yang; Ling and Yang Intellectual Property

(57) ABSTRACT

A method for performing policy and charging control in different roaming scenarios includes: establishing multiple Packet Data Network (PDN) connections to the same Access Point Name (APN), and performing relocation of a Bearer Binding and Event Report Function (BBERF) after establishing multiple PDN connections to the same APN. This method implements the policy and charging control on multiple PDN connections established to one APN in the roaming scenarios of the home routed and local breakout.

13 Claims, 15 Drawing Sheets

METHOD FOR IMPLEMENTING POLICY AND CHARGING CONTROL IN A ROAMING SCENE

TECHNICAL FIELD

The present invention relates to the communication field, and in particular, to a method for implementing policy and charging control in a roaming scenario.

BACKGROUND OF THE RELATED ART

An Evolved Packet System (EPS) of the 3rd Generation Partnership Project (3GPP) is composed of an Evolved Universal Terrestrial Radio Access Network (E-UTRAN), a Mobility Management Entity (MME), a Serving Gateway (S-GW), a Packet Data Network Gateway (P-GW), a Home Subscriber Server (HSS), a 3GPP Authentication Authorization Account (AAA) server, a Policy and Charging Rules Function (PCRF) and other supporting nodes.

FIG. 1 is a schematic diagram of a system structure of EPS in the related art, wherein, the MME is responsible for the related work of a control plane, such as a mobility management, a processing of non access stratum signalings, a management of the user mobile management context and so on; the S-GW is an access gateway device connecting with the E-UTRAN, is used to forward data between the E-UTRAN and the P-GW, and is responsible for buffering the paging waiting data; and the P-GW is a border gateway between the EPS and the Packet Data Network (PDN) network, and is responsible for functions such as the access of the PDN, forwarding data between the EPS and the PDN and so on;

the EPS supports the intercommunication with a non 3GPP network, and implements the intercommunication with the non 3GPP network through S2a/b/c interfaces. The non 3GPP network includes the trusted non 3GPP network and the un-trusted non 3GPP network. The IP access of the trusted non 3GPP network can interface with the P-GW directly through the S2a interface; and the IP access of the un-trusted non 3GPP network is required to connect with the P-GW through an Evolved Packet Data Gateway (ePDG), and the interface between the ePDG and the P-GW is the S2b.

If the EPS supports a Policy and Charging Control (PCC), then the PCRF makes the a policy and charging rule; the PCRF connects with the IP service network of an operator through a receiving interface Rx, and obtains the service information; besides, the PCRF connects with the gateway devices in the network through Gx/Gxa/Gxc interfaces, and is responsible for initiating the establishment of IP bearer, ensuring the Quality of Service (QoS) of the service data, and performing the charging control, wherein a Policy and Charging Enforcement Function (PCEF) is located in the P-GW, the PCRF and the P-GW exchange information through the Gx interface. When the interface between the P-GW and the S-GW is based on the Proxy Mobile IP (PMIP), a Bearer Binding and Event Report Function (BBERF) exists in the S-GW, and the S-GW and the PCRF exchange information through the Gxc interface. When accessing through the trusted non 3GPP network, there is also a BBERF residing in the trusted non 3GPP access gateway, and the access gateway of the trusted non 3GPP network and the PCRF exchange information through the Gxa interface. When the User Equipment (UE) is roaming, the interface between the home PCRF and the visited PCRF is an S9 interface, and at the same time, the Application Function (AF) providing services for the UE is located in the service network, and sends service information for generating the PCC policy to the PCRF through the Rx interface.

In the related art, the protocol used in the PCC architecture is a Diameter application protocol developed based on a Diameter Base Protocol, such as the application protocol applied in the Gx interface, the application protocol applied in the Rx interface, the application protocol applied in the Gxx interface (including the Gxa and the Gxc interfaces), the application protocol applied in the roaming interface S9 and so on. These application protocols define messages, commands, Attribute Value Pairs (AVP) and so on for the PCC. The Diameter sessions established by these protocols can be respectively called as a Gx session, a Gxx session, an Rx session and an S9 session. Various function entities of the PCC, through these sessions, perform the policy and charging control on the PDN connection established for the UE accessing network.

The EPS system supports the Multiple PDN access (multi-PDN accessing), that is, the UE can access multiple PDNs simultaneously through multiple P-GWs or one P-GW, and the EPS supports that the UE accesses simultaneously the same PDN many times. In the 3GPP, the corresponding PDN network can be found through the Access Point Name (APN, which also can be called as the PND identifier). Therefore, it can be considered that the UE can simultaneously access the same APN many times. Generally, one connection from the UE to the PDN network is called as one IP Connectivity Access Network (IP-CAN) session, and thus the EPS supports that the UE can have multiple IP-CAN sessions to one PDN at the same time.

FIG. 2 is a flow chart of the UE accessing the same APN twice (namely, establishing two PDN connections/IP-CAN sessions to the same PDN) through the trusted non 3GPP access network in the non roaming scenario according to the related art, and the specific steps are as follows:

step S201, the UE accesses the trusted non 3GPP access network by enforcing a specific processing procedure of the non 3GPP with the trusted non 3GPP access network;

step S202, the UE makes a request for performing a EPS access authentication to the HSS/AAA through the trusted non 3GPP access network after accessing the trusted non 3GPP access network; the HSS/AAA authenticates the UE which sends the request after receiving the EPS access authentication request; and the HSS/AAA sends P-GW selection information subscribed by the user and the APN subscribed by the user, including a default APN, to the trusted non 3GPP access gateway after completing the authentication on the UE, and below the "APN" denotes the "default APN" in the case that there is no ambiguity;

step S203, a layer 3 attachment flow is triggered after the authentication succeeding;

step S204, the trusted non 3GPP access gateway supports to establish multiple PDN connections to a single APN, and the trusted non 3GPP access gateway allocates a packet data network connection identifier1 (PDN Connection Id1) for uniquely differentiating the PDN connection to be established;

the BBERF residing in the trusted non 3GPP access gateway sends an indication message of gateway control session establishment to the PCRF, and a user identifier Network Access Identifier (NAI), a PDN identifier APN and the PDN Connection Id1 are carried in that message; that message makes a request for establishing one gateway control session (i.e., the Gxx session), which is identified as Gxx session1.

Step S205, the PCRF makes the PCC rule and QoS rule according to user subscription information, a network policy, an access network bearer attribute and so on, and at the same time, the PCRF may also make a corresponding event trigger; the PCRF sends the QoS rule and the event trigger to the trusted non 3GPP access gateway through a gateway control session establishment acknowledge message; and the trusted non 3GPP access gateway installs the QoS rule and the event trigger, and these rules are not policies regarding to the specific services, but are some default policies;

step S206, the trusted non 3GPP access gateway selects the P-GW according to the received P-GW selection information, and sends a proxy binding update message to the selected P-GW, wherein the user identifier NAI, the PDN identifier APN and the PDN Connection Id1 are carried in that message;

step S207, the P-GW allocates an IP address, which is identified as IP Address1, of the established PDN connection for the UE;

the PCEF residing in the P-GW sends an indication message of IP-CAN session establishment to the PCRF, and the user identifier NAI, the IP Address1, the PDN identifier APN and the PDN Connection Id1 are carried in that message; that message makes a request for establishing one Gx session, which is identified as the Gx session1.

Step S208, the PCRF associates the indication message of IP-CAN session establishment with the previous the indication message of gateway control session establishment according to the user identifier NAI, the PDN identifier APN and the PDN Connection Id1 after receiving the indication message of IP-CAN session establishment, that is, associates the gateway control session (Gxx session1) established in step S204 with the IP-CAN session (Gx session1) established in step S207; at the same time, the PCRF inquires the user subscription information, updates the previously made rules (including the PCC rule, the QoS rule and the event trigger) according to the user subscription information, the network policy, the access network bearer attribute and so on, and the PCRF sends an IP-CAN session establishment acknowledge message to the PCEF in the P-GW, wherein the PCC rule is carried in that message; and the above rules are not the policies regarding to the specific services, but are some default policies;

step S209, the PCEF which is located in the P-GW installs and enforces the PCC rule carried in the IP-CAN session establishment acknowledge message after receiving the IP-CAN session establishment acknowledge message, and at the same time, the P-GW sends its own IP address to the HSS;

step S210, the P-GW returns a proxy binding acknowledge message to the trusted non 3GPP access gateway, and the proxy binding acknowledge message includes the IP address (IP Address1) allocated by the P-GW for the PDN connection established by the UE;

step S211, if the QoS rule made in step S208 is different from that sent down in step S205, then the PCRF sends the updated QoS rule down to the BBERF in the trusted non 3GPP access gateway through the gateway control and QoS policy rule provision message;

step S212, the BBERF in the trusted non 3GPP access gateway installs the QoS rule, and returns the gateway control and QoS policy rule provision acknowledge message;

step S213, the layer 3 attachment is completed;

step S214, a PMIPv6 tunnel is established between the trusted non 3GPP access gateway and the P-GW, and the UE can send or receive data; the UE can access the dedicated services through the established PDN connection, and the PCRF also can make the corresponding policies for resource reservation according to the characteristics of the accessed services; these policies can be considered as the dedicated policies for accessing the services;

step S215, the UE decides to initiate to establish a second PDN connection to the APN, and the UE sends a request message of triggering new PDN connection establishment to the trusted non 3GPP access gateway, wherein the PDN identifier APN is carried in that message;

step S216, the trusted non 3GPP access gateway allocates the PDN Connection Id2 for uniquely differentiating the second PDN connection to be established;

the BBERF residing in the trusted non 3GPP access gateway sends the indication message of gateway control session establishment to the PCRF, and the user identifier NAI, the PDN identifier APN and the PDN Connection Id2 are carried in that message; that message makes a request for establishing one gateway control session (Gxx session), which is identified as the Gxx session2.

Step S217, the PCRF makes the PCC rule and the QoS rule according to the user subscription information, the network policy, the access network bearer attribute and so on, and at the same time, the PCRF may also make the corresponding event trigger; the PCRF sends the QoS rule and the event trigger to the trusted non 3GPP access gateway through the gateway control session establishment acknowledge message; and the trusted non 3GPP access gateway installs the QoS rule and the event trigger; these rules are not policies regarding to the specific services, but are some default policies;

step S218, the trusted non 3GPP access gateway sends the proxy binding update message to the selected P-GW, and the user identifier NAI, the PDN identifier APN and the PDN Connection Id2 are carried in that message;

step S219, the P-GW allocates the IP address, which is identified as IP Address2, of the established second PDN connection for the UE;

the PCEF residing in the P-GW sends the indication message of IP-CAN session establishment to the PCRF, and the user identifier NAI, the IP Address2, the PDN identifier APN and the PDN Connection Id2 are carried in that message; that message makes a request for establishing one Gx session, which is identified as the Gx session2.

Step S220, the PCRF associates the indication message of IP-CAN session establishment with the indication message of gateway control session establishment of step S216 according to the user identifier NAI, the PDN identifier APN and the PDN Connection Id2 after receiving the indication of IP-CAN session establishment, that is, associates the gateway control session (Gxx session2) established in step S216 with the IP-CAN session (Gx session2) established in step S219; at the same time, the PCRF inquires the user subscription information, updates the previously (step S217) made rules (including the PCC rule, QoS rule and event trigger) according to the user subscription information, the network policy, the bearer attribute of the access network and so on, and the PCRF sends the IP-CAN session establishment acknowledge message to the PCEF in the P-GW, wherein the PCC rule is carried in that message; these rules are not the policies regarding to the specific services, but are some default policies;

step S221, the PCEF in the P-GW installs and enforces the PCC rule carried in the IP-CAN session establishment acknowledge message after receiving the IP-CAN session establishment acknowledge message, and at the same time, the P-GW sends its own IP address to the HSS;

step S222, the P-GW returns the proxy binding acknowledge message to the trusted non 3GPP access gateway, and the proxy binding acknowledge message carries the IP address (IP Address2) allocated by the P-GW for the second PDN connection established by the UE;

step S223, if the QoS rule made in step S220 is different from that sent down in step S217, then the PCRF sends the updated QoS rule down to the trusted non 3GPP access gateway through the gateway control and QoS policy rule provision message;

step S224, the trusted non 3GPP access gateway installs the QoS rule, and returns the gateway control and QoS policy rule provision acknowledge message;

step S225, the trusted non 3GPP access gateway returns a reply message carrying the IP Address2 to the UE;

step S226, a second PMIPv6 tunnel is established between the trusted non 3GPP access gateway and the P-GW, and the UE can send or receive data; the UE will use the second established PDN connection to access some dedicated services in subsequent flows, and the PCRF will make the corresponding policies for the resource reservation according to the characteristics of the services, and these policies can be considered as the dedicated policies for accessing the services.

It can be seen from the above flow that, in order to support to establish multiple PDN connections to the single APN, the trusted non 3GPP access gateway should allocate one PDN Connection Id for each PDN connection with the same APN for uniquely differentiating each PDN connection accessing the same PDN. The PCRF associates the gateway control session (Gxx session) with the IP-CAN session (Gx session) according to the user identifier NAI, the PDN identifier APN and the PDN Connection Id.

The similar PDN establishment flow can also be used for accessing by the UE through the E-UTRAN, and the PMIPv6 protocol is adopted between the S-GW and the P-GW. The difference is that the PDN Connection Id is a bearer identifier of a default bearer of the PDN connection allocated by the MME when the access is based on the E-UTRAN.

FIG. 3 is a flow chart of a handover across the systems (namely, the handover from one non 3GPP system to another non 3GPP system) occurring after the UE establishes two PDN connections to the default APN according to the flow of FIG. 2 in the non roaming scenario according to the related art; and before the flow shown in FIG. 3 starts, it is assumed that the UE accesses through the trusted non 3GPP access network1 and establishes two PDN connections to the APN, and the UE accesses its own dedicated services through the two PDN connections respectively; the PCRF respectively makes the dedicated PCC rule and QoS rule for own dedicated services for the resource reservation of the bearer layer; the specific steps of the flow shown in FIG. 3 are as follows:

step S301, the UE detects a trusted non 3GPP access network2, and decides to initiate the handover;

step S302, the UE makes a request for performing the EPS access authentication to the HSS/AAA through the trusted non 3GPP access network after accessing the trusted non 3GPP access network2; the HSS/AAA authenticates the UE which sends the request after receiving the EPS access authentication request; and the HSS/AAA sends the IP address of the P-GW selected by the UE when accessing through the trusted non 3GPP access network1 and the user subscribed APN, including the default APN, to the trusted non 3GPP access gateway2 after completing the authentication on the UE;

step S303, a layer 3 attachment flow is triggered after the authentication succeeding;

step S304, the trusted non 3GPP access gateway2 supports to establish multiple PDN connections to the single APN, and the trusted non 3GPP access gateway2 allocates a PDN Connection Id3 for uniquely differentiating the PDN connection to be re-established;

the BBERF residing in the trusted non 3GPP access gateway2 sends the indication message of gateway control session establishment to the PCRF, wherein the user identifier NAI, the PDN identifier APN, the PDN Connection Id3 and the bearer attribute of the new access network are carried in that message, and that message makes a request for establishing one gateway control session (Gxx session), which is identified as the Gxx session3.

The bearer attribute of the access network includes: the IP-CAN type and BBERF address; besides, the bearer attribute of the access network can also include the Radio Access Technology (RAT) type.

It should be noted that, since there is no information exchange between the trusted non 3GPP access gateway1 and the trusted non 3GPP access gateway2, the respective allocated PDN Connection Ids are different.

Step S305, the PCRF determines that the handover of the UE occurs according to the bearer attribute of the new access network, and finds the information before the user hands over according to the user identifier NAI and the PDN identifier APN; however, since the PDN Connection Id3 is a new identifier, the PCRF is unable to judge which PDN connection before the handover should be associated (that is, which IP-CAN session (Gx session) before the handover is associated), thus the PCRF is unable to send down the dedicated policy related to a certain dedicated service accessed by the UE before the handover, but is only able to make the default QoS rule and event trigger according to information such as the user subscription information, the network policy, the bearer attribute of the new access network and so on, and sends these default QoS rule and event trigger to the BBERF in the trusted non 3GPP access gateway2 through the gateway control session establishment acknowledge message; and the BBERF located in the trusted non 3GPP access gateway2 installs the QoS rule and the event trigger;

step S306, the trusted non 3GPP access gateway2 sends the proxy binding update message to the P-GW, wherein the user identifier NAI, the PDN identifier APN and the PDN Connection Id3 are carried in that message; and step S306 can perform sending just after receiving the message (layer 3 attachment triggering message) of step S303 instead of waiting for the acknowledge message of step S305;

step S307, the P-GW in which the PCEF resides selects one PDN connection from the PDN connections established by the source system (i.e., the trusted non 3GPP access system1) to perform the re-establishment after receiving the proxy binding update message; and it is assumed that the P-GW decides to firstly re-establish the first PDN connection established in the source system for the UE, then the PCEF sends an indication message of IP-CAN session modification (in which that message modifies the first IP-CAN session, i.e., the Gx session1, established by the source system) to the PCRF, that message carries the PDN Connection Id3, and that message can also carry the user identifier NAI, the PDN identifier APN and the IP Address1;

step S308, the PCRF, after receiving the indication of IP-CAN session modification, associates the gateway control session establishment message of step S304 with the indication message of IP-CAN session modification according to the user identifier NAI, the PDN identifier APN and the PDN Connection Id3, that is, associates the new gateway control session (Gxx session3) with the first IP-CAN session (Gx session1) established in the source system; the PCRF is likely to modify the PCC rule, QoS rule and event trigger (including the default rules and the dedicated rules) of the first PDN connection established before the UE hands over according to the information such as the bearer attribute of the new access network and so on, and send the updated PCC rule and event trigger to the PCEF in the P-GW through an IP-CAN session modification acknowledge message; and the PCEF installs and enforces the PCC rule and the event trigger after receiving the IP-CAN session modification acknowledge message;

step S309, the P-GW returns the proxy binding acknowledge message to the trusted non 3GPP access gateway2, and the IP Address1 is carried in that message;

step S310, the PCRF sends the QoS rule and event trigger updated in step S308 down to the BBERF of the trusted non 3GPP access gateway2 through the gateway control and QoS policy rule provision message;

step S311, the BBERF located in the trusted non 3GPP access gateway2 installs the QoS rule and the event trigger, and returns the gateway control and QoS policy rule provision acknowledge message;

step S312, the layer 3 attachment is completed;

step S313, the PMIPv6 tunnel is established between the trusted non 3GPP access gateway2 and the P-GW, and the UE re-establishes the first PDN connection from the source system to the default APN; and the UE can access the dedicated services which have been applied for being accessed in the source system through that PDN connection;

step S314, the UE sends a triggering indication message to the trusted non 3GPP access gateway2, wherein, the APN and a handover indication are carried in that message, and the handover indication is used for indicating to re-establish one PDN connection before the handover to the trusted non 3GPP access gateway2;

step S315, the trusted non 3GPP access gateway2 in which the BBERF resides allocates a PDN Connection Id4 for uniquely differentiating the PDN connection to be re-established; the BBERF sends the indication message of gateway control session establishment to the PCRF, wherein, the user identifier NAI, the PDN identifier APN and the PDN Connection Id4 are carried in that message; that message makes a request for establishing one gateway control session (the Gxx session), which is identified as the Gxx session4;

step S316, the PCRF finds the information before the user hands over according to the user identifier NAI and the PDN identifier APN; however, since the PDN Connection Id4 is a new identifier, the PCRF is unable to bind the PDN Connection Id4 on a certain PDN connection before the handover, thus the PCRF is unable to send down the dedicated policy related to the dedicated service accessed by the UE before the handover; but is only able to make the QoS rule and the event trigger according to the user subscription information, the network policy and the bearer attribute of the current access network, and send these default QoS rule and event trigger to the BBERF in the trusted non 3GPP access gateway2 through the gateway control session establishment acknowledge message; and the BBERF of the trusted non 3GPP access gateway2 installs the QoS rule and the event trigger;

step S317, the trusted non 3GPP access gateway2 sends the proxy binding update message to the P-GW, wherein the user identifier NAI, the PDN identifier APN and the PDN Connection Id4 are carried in that message; and step S317 can perform sending just after receiving the message of step S314 instead of waiting for the acknowledge message of step S316;

step S318, the P-GW in which the PCEF resides, after receiving the proxy binding update message, selects one PDN from the PDN connections established by the source system to perform the re-establishment, and since only the second PDN connection established by the source system is left, the P-GW decides to re-establish the second PDN connection established in the source system for the UE; the PCEF sends the indication message of IP-CAN session modification (in which that message modifies the second IP-CAN session established by the source system, i.e., the Gx session2) to the PCRF, that message carries the PDN Connection Id4, and that message can further carry the user identifier NAI, the PDN identifier APN and the IP Address2;

step S319, the PCRF, after receiving the indication message of IP-CAN session modification, associates the gateway control session establishment message of step S315 with the indication message of IP-CAN session modification according to the user identifier NAI, the PDN identifier APN and the PDN Connection Id4, that is, associates the new gateway control session (Gxx session4) with the second IP-CAN session (Gx session2) established in the source system; the PCRF is likely to modify the PCC rule, QoS rule and event trigger (including the default rules and the dedicated rules) of the second PDN connection established before the UE hands over according to information such as the bearer attribute of the new access network and so on, and send the updated PCC rule and event trigger to the PCEF in the P-GW through the IP-CAN session modification acknowledge message; and the PCEF in the P-GW installs and enforces the PCC rule and the event trigger after receiving the IP-CAN session modification acknowledge message;

step S320, the P-GW returns the proxy binding acknowledge message to the trusted non 3GPP access gateway2, and the IP Address2 is carried in that message;

step S321, the trusted non 3GPP access gateway2 returns the reply message to the UE, wherein the IP Address2 is carried in that reply message;

step S322, the PCRF sends the QoS rule and event trigger updated in step S319 down to the BBERF in the trusted non 3GPP access gateway2 through the gateway control and QoS policy rule provision message;

step S323, the BBERF located in the trusted non 3GPP access gateway2 returns the gateway control and QoS rule provision acknowledge message;

step S324, another PMIPv6 tunnel is also established between the trusted non 3GPP access gateway2 and the P-GW, and the UE re-establishes the second PDN connection from the source system to the default APN; and the UE can access the dedicated services which have been applied for being assessed in the source system through that PDN connection.

It can be seen from the above flow that, when the handover of the UE across the systems occurs, since two access gateways are unable to interact, the PDN Connection Ids allocated respectively for supporting establishing multiple PDN connections to one APN are different. Therefore, when the PCRF receives the indication message of gateway control session establishment sent by the destination BBERF, the PCRF is unable to immediately associate it with a certain PDN connection (the IP-CAN session, i.e., the Gx session) established in the source system, but the PCRF has to wait for the P-GW making the selection, and makes the association according to the PDN Connection Id carried in the indication message of IP-CAN session modification.

However, in the prior art, it only discusses the method for performing the policy and charging control for establishing multiple PDN connections to one APN in the non roaming scenario. For the roaming scenario, the related art has not related to.

The EPS has two roaming architectures, the first one is home routed and the second one is local breakout. FIG. 4 is a roaming architecture diagram of the EPS of the home routed according to the related art, and as shown in FIG. 4, the P-GW is in the home network and the IP services are provided by the home network operator (namely, the AF is in the home network); FIG. 5 is a roaming architecture diagram of the EPS of the local breakout according to the related art, and as shown in FIG. 5, the P-GW is in the visited network and the IP services are provided by the home network operator (namely, the AF is in the home network), or the visited network operator provides the IP services (namely, the AF is in the visited network). For different roaming scenarios, the flows of the PCC are different, and the functions enforced by the PCC network element are also different.

At present, in the scheme of implementing the S9 roaming interface, the Visited PCRF (vPCRF) terminates the Gx sessions, existing in the visited network, of all the IP-CAN sessions established by the UE and the gateway control sessions (Gxx sessions), that is, the Gxx sessions and the Gx sessions will not be sent to the Home PCRF (hPCRF), but one S9 session is established between the vPCRF and the hPCRF, and that S9 session is used to transmit the information on the Gx sessions of all the IP-CAN sessions and the gateway control sessions (Gxx sessions), however, the Rx sessions, in the visited network, of all the IP-CAN sessions will not be terminated, the messages of the Rx sessions are only forwarded to the home PCRF, and the vPCRF is taken as one Proxy. Multiple subsessions (which are called as S9 subsessions) possibly exists in one S9 session, and each subsession is used for transmitting information on the Gx session of one IP-CAN session and the gateway control session (Gxx session).

In summary, the difficulty exists in performing the policy and charging control on multiple PDN connections established to one APN in the roaming scenario due to the complexity of the EPS roaming scenario and the complexity of the policy and charging control itself in the roaming scenario, and the related art has no corresponding solution yet.

SUMMARY OF THE INVENTION

The technical problem to be solved in the present invention is to overcome the drawbacks in the related art and to provide a method for performing policy and charging control on multiple PDN connections established to one APN in a roaming scenario.

In order to solve the above problem, the present invention provides a method for performing policy and charging control in a roaming scenario, which comprises: after establishing a Packet Data Network (PDN) connection for a User Equipment (UE) and establishing a first gateway control session, a Gx session, an S9 session and a first subsession of the S9 session for performing a policy and charging control on said PDN connection, and in a process of a Bearer Binding and Event Report Function (BBERF) relocation:

a destination BBERF sending an indication message of gateway control session establishment, which includes a PDN connection identifier for uniquely identifying said PDN connection, to a visited Policy and Charging Rule Function (PCRF) so as to establish a second gateway control session; after receiving the indication message of gateway control session establishment, said visited PCRF sending a request message, which includes said PDN connection identifier, to a home PCRF so as to establish a second subsession of said S9 session, and associating said second subsession with said second gateway control session;

a gateway at which said destination BBERF resides sending a proxy binding update message, which includes said PDN connection identifier, to a gateway at which a Policy and Charging Enforcement Function (PCEF) resides; after receiving the proxy binding update message, said PCEF sending an indication message of IP Connectivity Access Network (IP-CAN) session modification, which includes said PDN connection identifier, to said home PCRF; and after receiving said indication message of IP-CAN session modification, said home PCRF associating the Gx session modified by said indication message of IP-CAN session modification with said second subsession according to said PDN connection identifier.

Besides, after the step of associating said Gx session with said second subsession, the method further comprises: said home PCRF modifying policies of the PDN connection corresponding to said Gx session according to a bearer attribute of a new access network, sending a Policy and Charging Control (PCC) rule in the modified policies to the PCEF through said Gx session, and sending a Quality of Service (QoS) rule in the modified policies to the visited PCRF through said second subsession, and the visited PCRF sending said QoS rule to the destination BBERF through said second gateway control session.

Besides, the method further comprises: after receiving an indication message of S9 session modification, said home PCRF sending a default QoS rule made for a user to the visited PCRF through an S9 session modification acknowledge message of said second subsession, and the visited PCRF sending the default QoS rule to the destination BBERF through a gateway control session establishment acknowledge message of said second gateway control session.

The method further provides a method for performing policy and charging control in a roaming scenario, which comprises: after establishing a Packet Data Network (PDN) connection for a User Equipment (UE) and establishing a first gateway control session, a Gx session, an S9 session and a first subsession of the S9 session for performing a policy and charging control on said PDN connection, and in a process of a Bearer Binding and Event Report Function (BBERF) relocation:

a destination BBERF sending an indication message of gateway control session establishment, which includes a PDN connection identifier for uniquely identifying said PDN connection, to a visited Policy and Charging Rule Function (PCRF) so as to establish a second gateway control session;

a gateway at which said destination BBERF resides sending a proxy binding update message, which includes said PDN connection identifier, to a gateway at which a Policy and Charging Enforcement Function (PCEF) resides; after receiving the proxy binding update message, said PCEF sending an indication message of IP Connectivity Access Network (IP-CAN) session modification, which includes said PDN connection identifier, to said visited PCRF; and after receiving said indication message of IP-CAN session modification, said visited PCRF establishing a second subsession of said S9 session with a home PCRF, and associating said second subsession with said Gx session and said second gateway control session according to said PDN connection identifier.

Besides, in the step of said visited PCRF establishing the second subsession of said S9 session with said home PCRF, the visited PCRF establishing said second subsession by sending an indication message of S9 session modification to the home PCRF; and the indication message of S9 session modification includes an IP address of the PDN connection corresponding to said Gx session.

Besides, the method further comprises:

after receiving said indication message of S9 session modification, said home PCRF modifying policies of the PDN connection corresponding to said IP address, and including the modified policies into an S9 session modification acknowledge message to send to the visited PCRF; and after receiving said S9 session modification acknowledge message, said visited PCRF sending a Policy and Charging Control (PCC) rule in the modified policies to the PCEF through said Gx session, and sending a Quality of Service (QoS) rule in the modified policies to the destination BBERF through said second gateway control session.

Besides, the method further comprises:

after receiving said indication message of S9 session modification, said home PCRF modifying the PCC rule of the PDN connection corresponding to said IP address, and including the modified PCC rule into an S9 session modification acknowledge message to send to the visited PCRF; and after receiving said S9 session modification acknowledge message, said visited PCRF sending the modified PCC rule to the PCEF through said Gx session, making a Quality of Service (QoS) rule according to said PCC rule, and sending the made QoS rule to the destination BBERF through said second gateway control session.

Besides, said indication message of gateway control session establishment includes a session identifier information and a bearer attribute of an access network; and said method further comprises:

after receiving said indication message of gateway control session establishment, said visited PCRF searching a default QoS rule corresponding to said session identifier information, modifying said default QoS rule according to said bearer attribute of the access network, and then sending to the destination BBERF through a gateway control session establishment acknowledge message.

Besides, said session identifier information includes a user identifier and a PDN identifier.

The present invention further provides a method for performing policy and charging control in a roaming scenario, which comprises:

a Bearer Binding and Event Report Function (BBERF) sending an indication message of gateway control session establishment, which includes a Packet Data Network (PDN) connection identifier for uniquely identifying a PDN connection, to a visited Policy and Charging Rule Function (PCRF) so as to establish a gateway control session; after receiving the indication message of gateway control session establishment, said visited PCRF sending an indication message of S9 session establishment or an indication message of S9 session modification, which includes said PDN connection identifier, to a home PCRF so as to establish a subsession of an S9 session, and associating said subsession with said gateway control session;

a gateway at which said BBERF resides sending a proxy binding update message, which includes said PDN connection identifier, to a gateway at which a Policy and Charging Enforcement Function (PCEF) resides; after receiving the proxy binding update message, said PCEF sending an indication message of IP Connectivity Access Network (IP-CAN) session establishment, which includes said PDN connection identifier, to the home PCRF so as to establish a Gx session; and after receiving said indication message of IP-CAN session establishment, said home PCRF associating said Gx session with said subsession according to said PDN connection identifier.

Besides, the method further comprises:

after receiving said indication message of S9 session establishment or the indication message of S9 session modification, said home PCRF including a default Quality of Service (QoS) rule made for a user into an S9 session establishment acknowledge message or an S9 session modification acknowledge message to send to said visited PCRF; said visited PCRF including said default QoS rule into a gateway control session establishment acknowledge message to send to said BBERF; and after receiving said indication message of IP-CAN session establishment, said home PCRF including a default Policy and Charging Control (PCC) rule made for a user into an IP-CAN session establishment acknowledge message to send to said PCEF.

Besides, the method further comprises:

after receiving said indication message of IP-CAN session establishment, said home PCRF updating said default QoS rule, and sending the updated default QoS rule to the visited PCRF through said subsession, and said visited PCRF sending the updated default QoS rule to said BBERF through said gateway control session.

The present invention further provides a method for performing policy and charging control in a roaming scenario, which comprises:

a Bearer Binding and Event Report Function (BBERF) sending an indication message of gateway control session establishment, which includes a Packet Data Network (PDN) connection identifier for uniquely identifying said PDN connection, to a visited Policy and Charging Rule Function (PCRF) so as to establish a gateway control session; after receiving the indication message of gateway control session establishment, said visited PCRF sending an indication message of S9 session establishment or an indication message of S9 session modification, which includes said PDN connection identifier, to a home PCRF so as to establish a subsession of an S9 session;

a gateway at which said BBERF resides sending a proxy binding update message, which includes said PDN connection identifier, to a gateway at which a Policy and Charging Enforcement Function (PCEF) resides; after receiving the proxy binding update message, said PCEF sending an indication message of IP Connectivity Access Network (IP-CAN) session establishment, which includes said PDN connection identifier, to said visited PCRF so as to establish a Gx session; and said visited PCRF associating said Gx session with said gateway control session and said subsession according to said PDN connection identifier.

Besides, the method further comprises:

after receiving said indication message of IP-CAN session establishment, said visited PCRF sending the indication message of S9 session establishment or the indication message of S9 session modification, which includes said PDN connection identifier, to the home PCRF;

after receiving the indication message of S9 session establishment or the indication message of S9 session modification sent by the visited PCRF, said home PCRF including default policies made for a user into an S9 session establishment acknowledge message or an S9 session modification acknowledge message to send to said visited PCRF; and after receiving said S9 session establishment acknowledge message or said S9 session modification acknowledge message, said visited PCRF including a Quality of Service (QoS) rule in said default policies into a gateway control session establishment acknowledge message to send to said BBERF, and including a Policy and Charging Control (PCC) rule in said default policies into an IP-CAN session establishment acknowledge message to send to said PCEF.

In conclusion, with the method of the present invention, the present invention implements the method for performing policy and charging control on multiple PDN connections established to one APN in the roaming scenarios of the home routed and local breakout, which makes up for the deficiency in the related art.

PREFERRED EMBODIMENTS OF THE PRESENT INVENTION

Below the method for implementing the policy and charging control in different roaming scenarios (including the method of establishing multiple PDN connections to the same APN and the method of re-selecting a BBERF after establishing multiple PDN connections to the same APN) according to the present invention will be described in detail with reference to drawings and embodiments.

Embodiment 1

Home Routed

Figure 1:
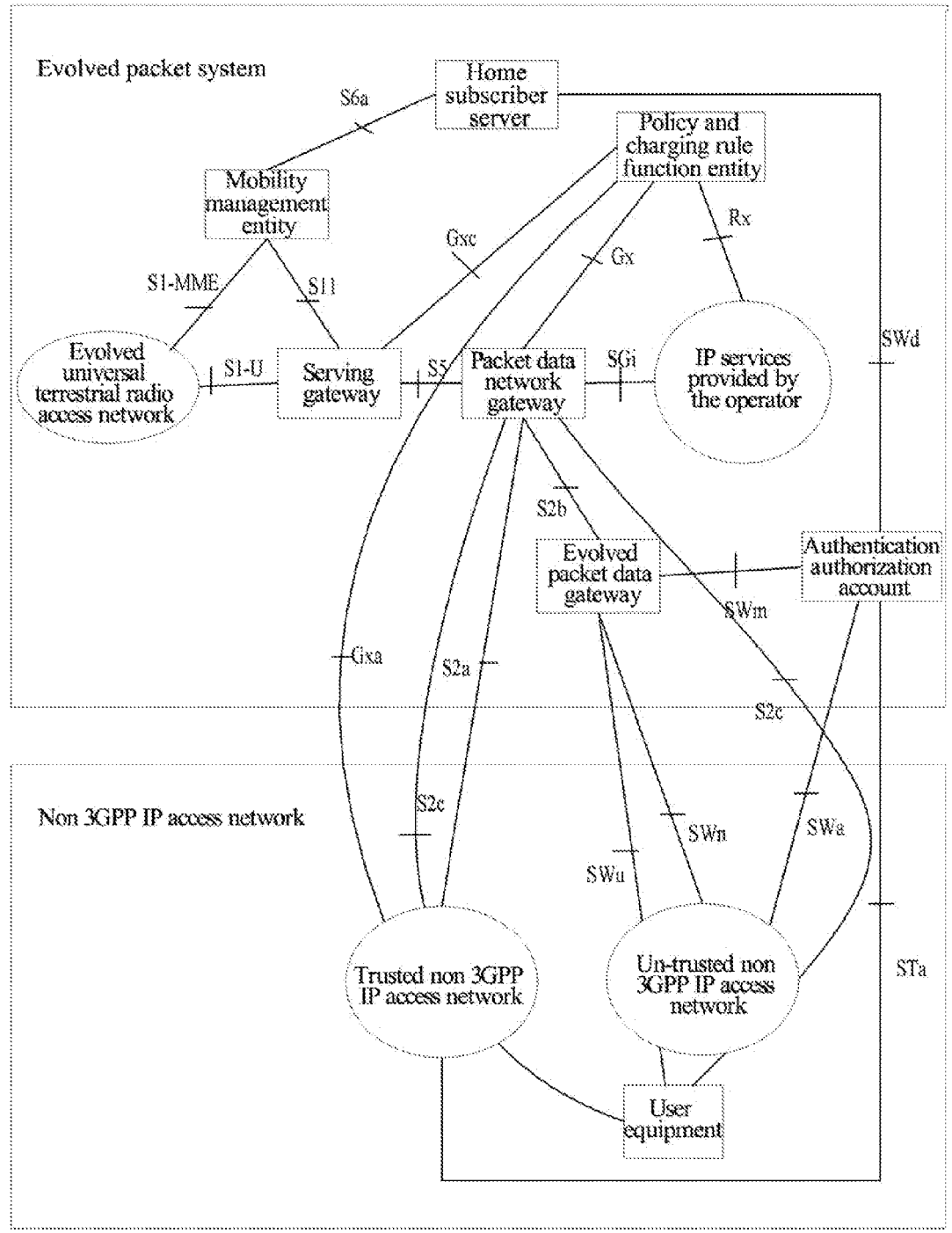
FIG. 1 is a structure schematic diagram of an EPS system in the related art.
Figure 2A:
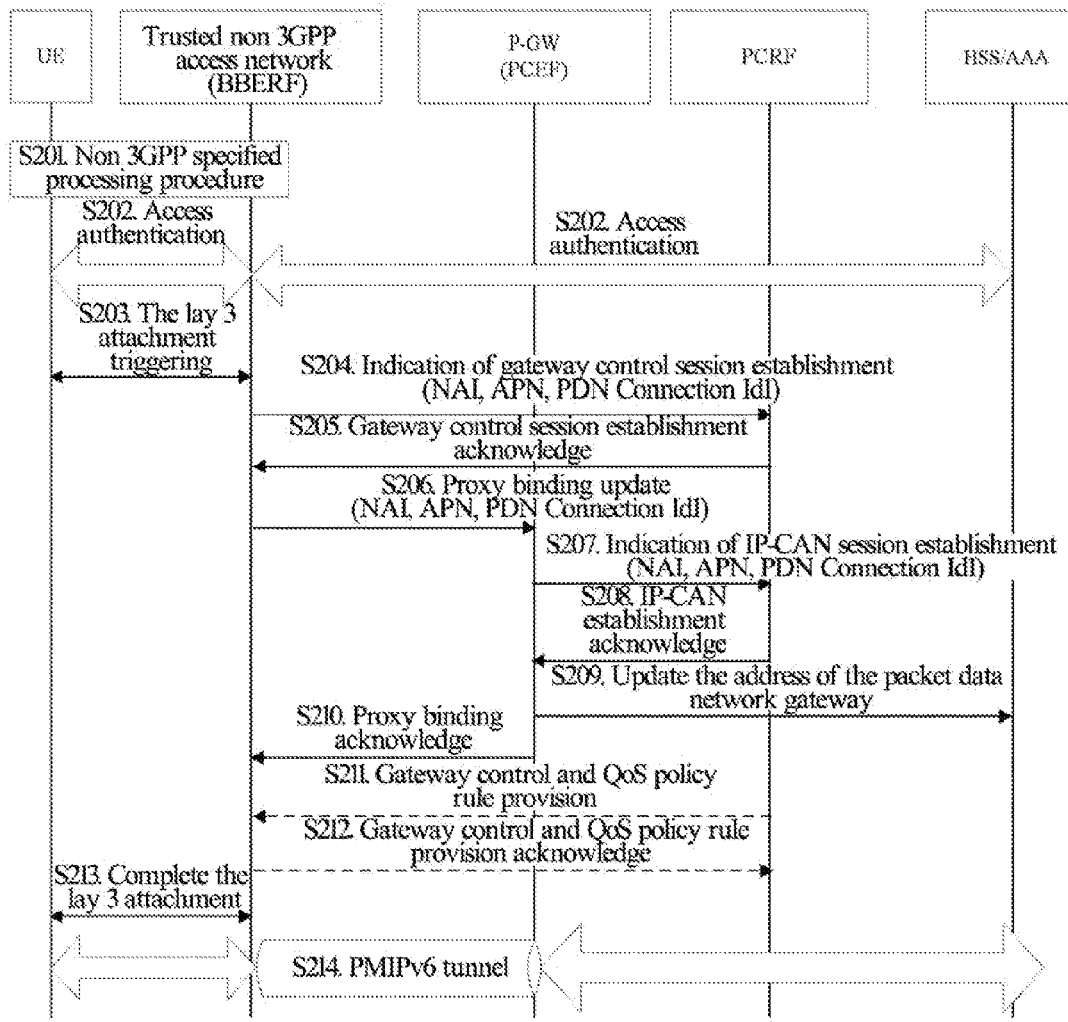
FIG. 2 is a flow chart of a method for a UE accessing the same one APN twice through a trusted non 3GPP access network (namely, establishing two PDN connections/IP-CAN sessions to the same one PDN) in a non roaming scenario in the related art.
Figure 2B:
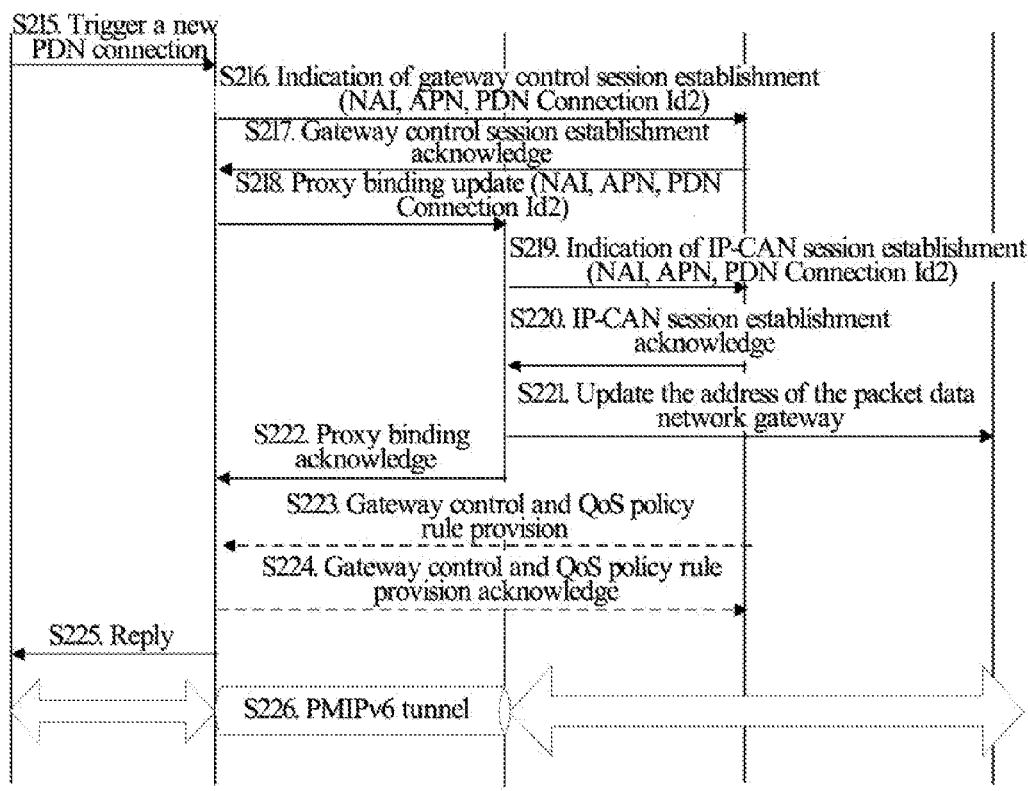
Figure 3A:
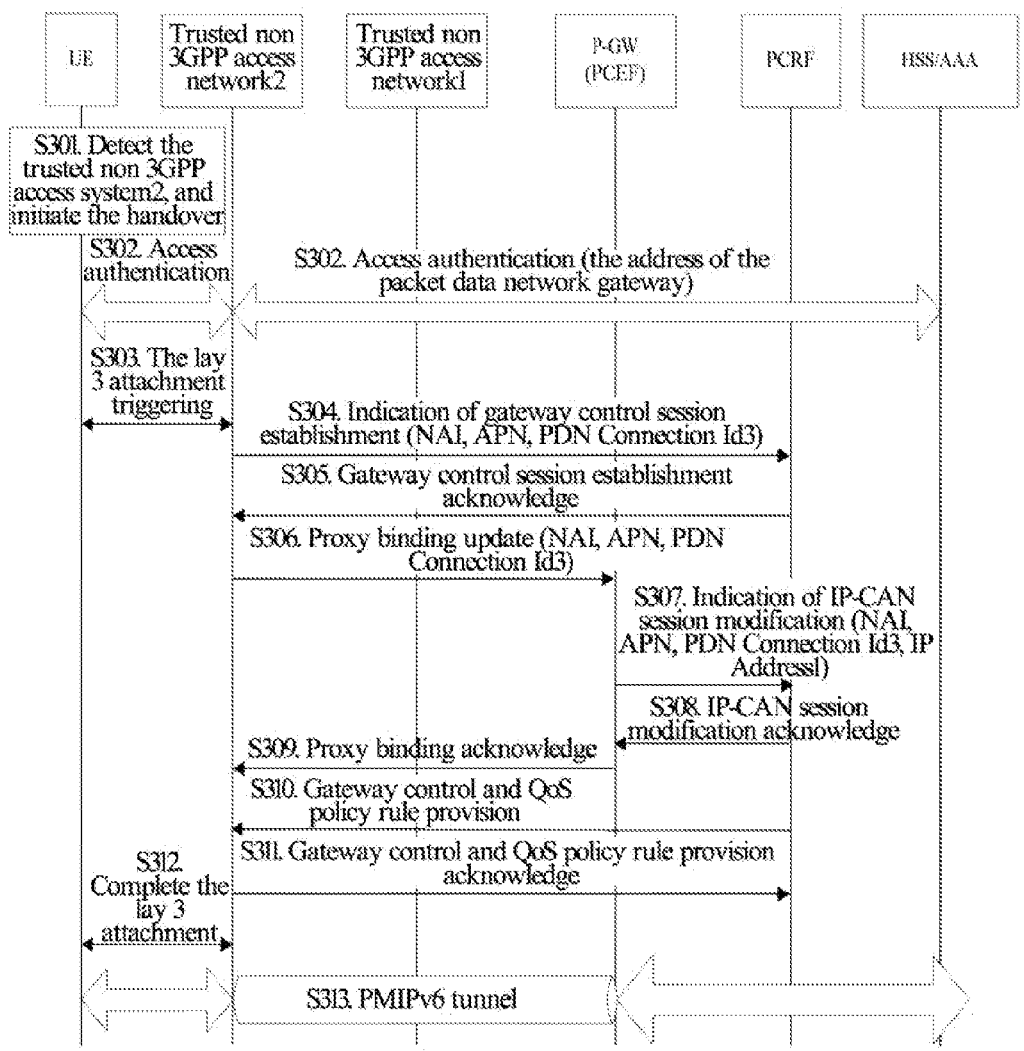
FIG. 3 is a flow chart of an across-system handover (namely the handover from one non 3GPP system to another non 3GPP system) occurring after the UE establishing 2 PDN connections to a default APN according to the flow chart shown in FIG. 2 in a non roaming scenario in the related art.
Figure 3B:
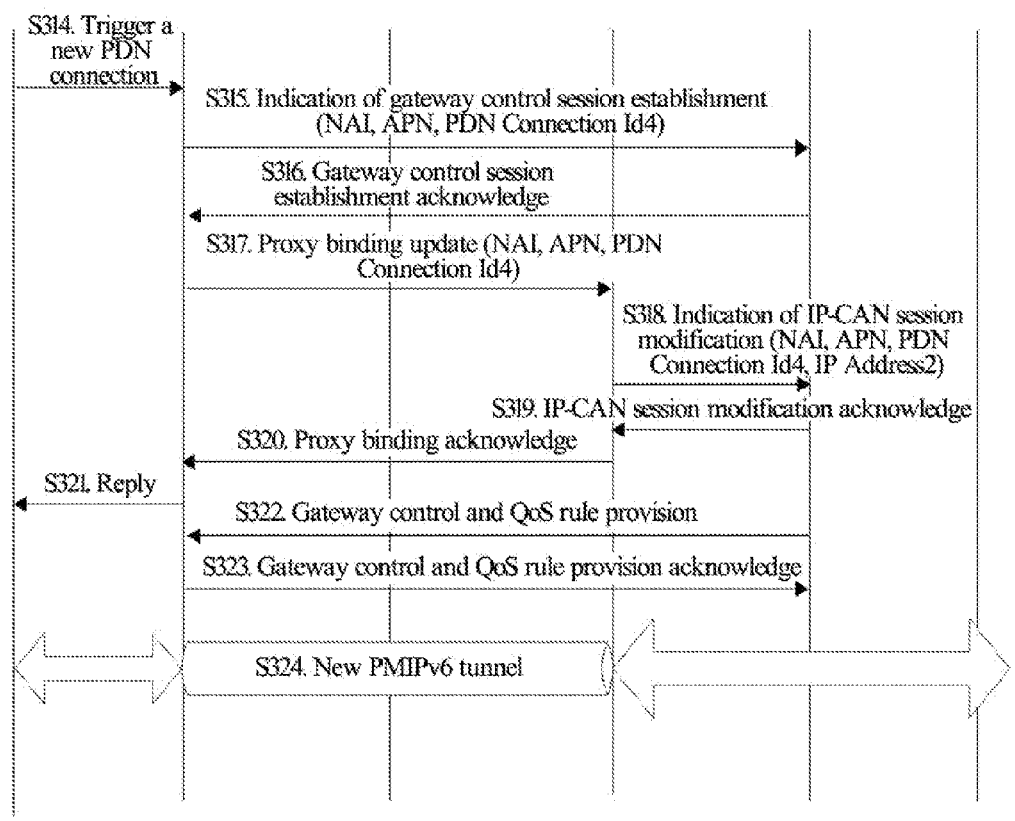
Figure 4:
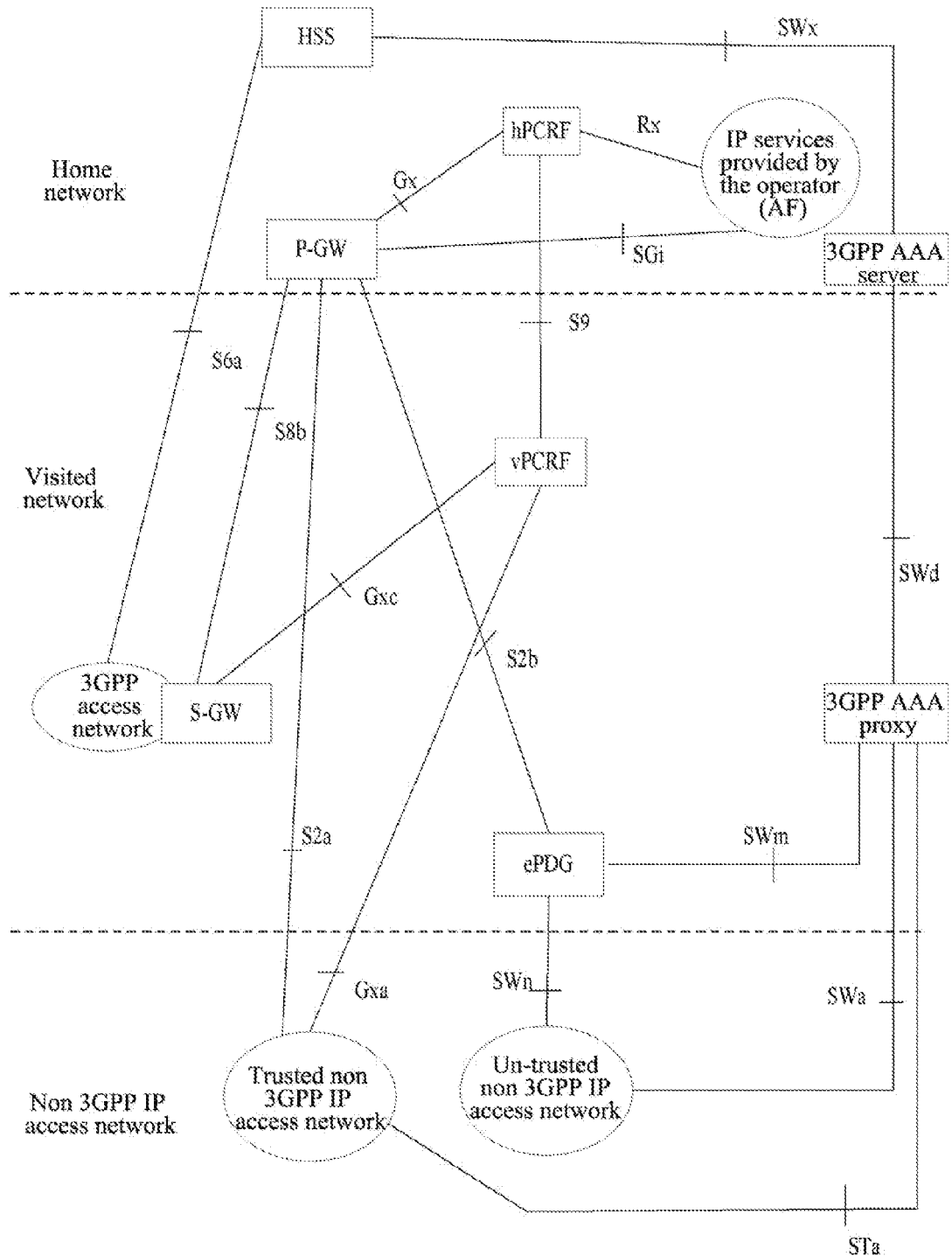
FIG. 4 is a structure diagram of an EPS roaming architecture of home routed in the related art.
Figure 5:
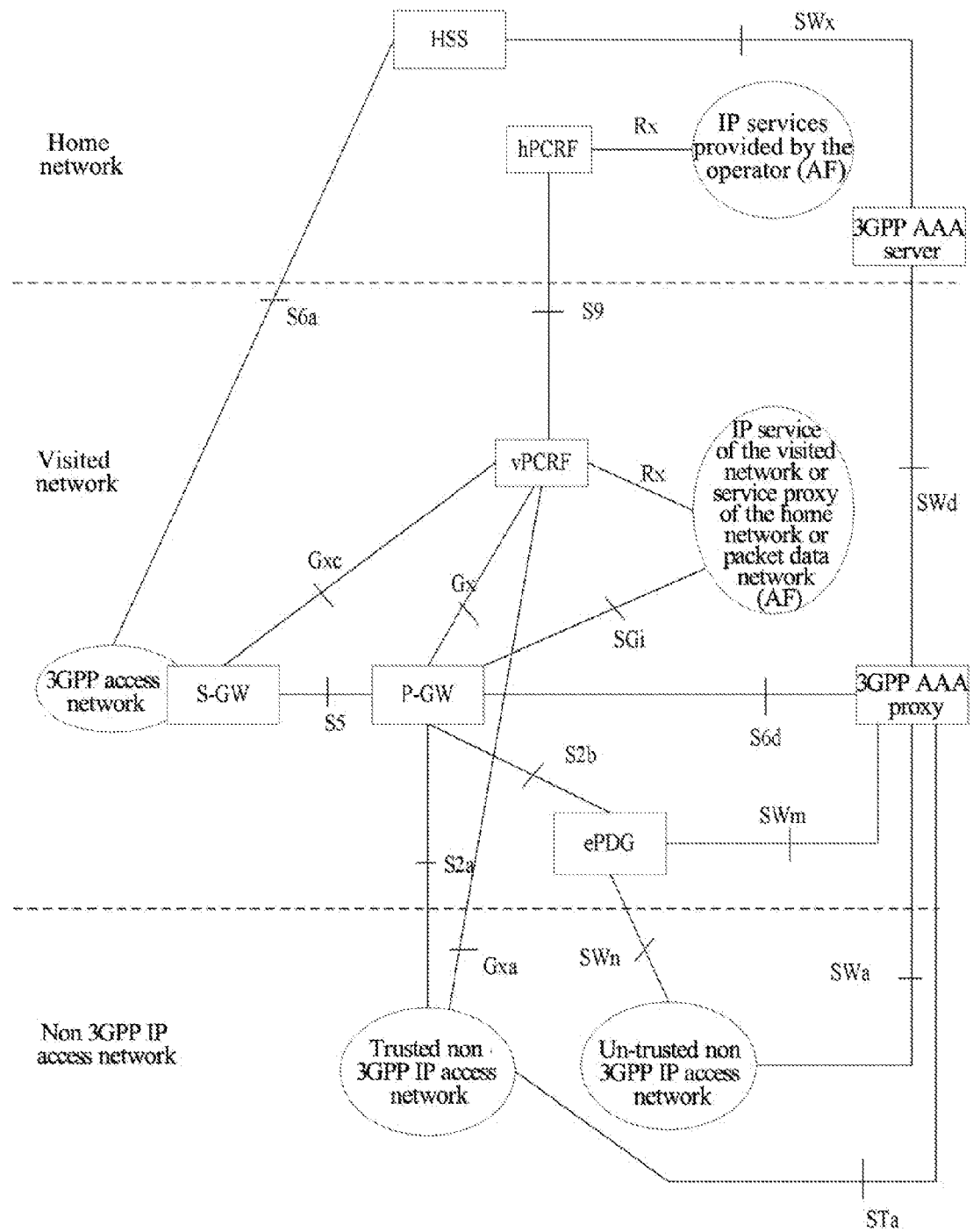
FIG. 5 is a structure diagram of an EPS roaming architecture of local breakout in the related art.
Figure 6A:
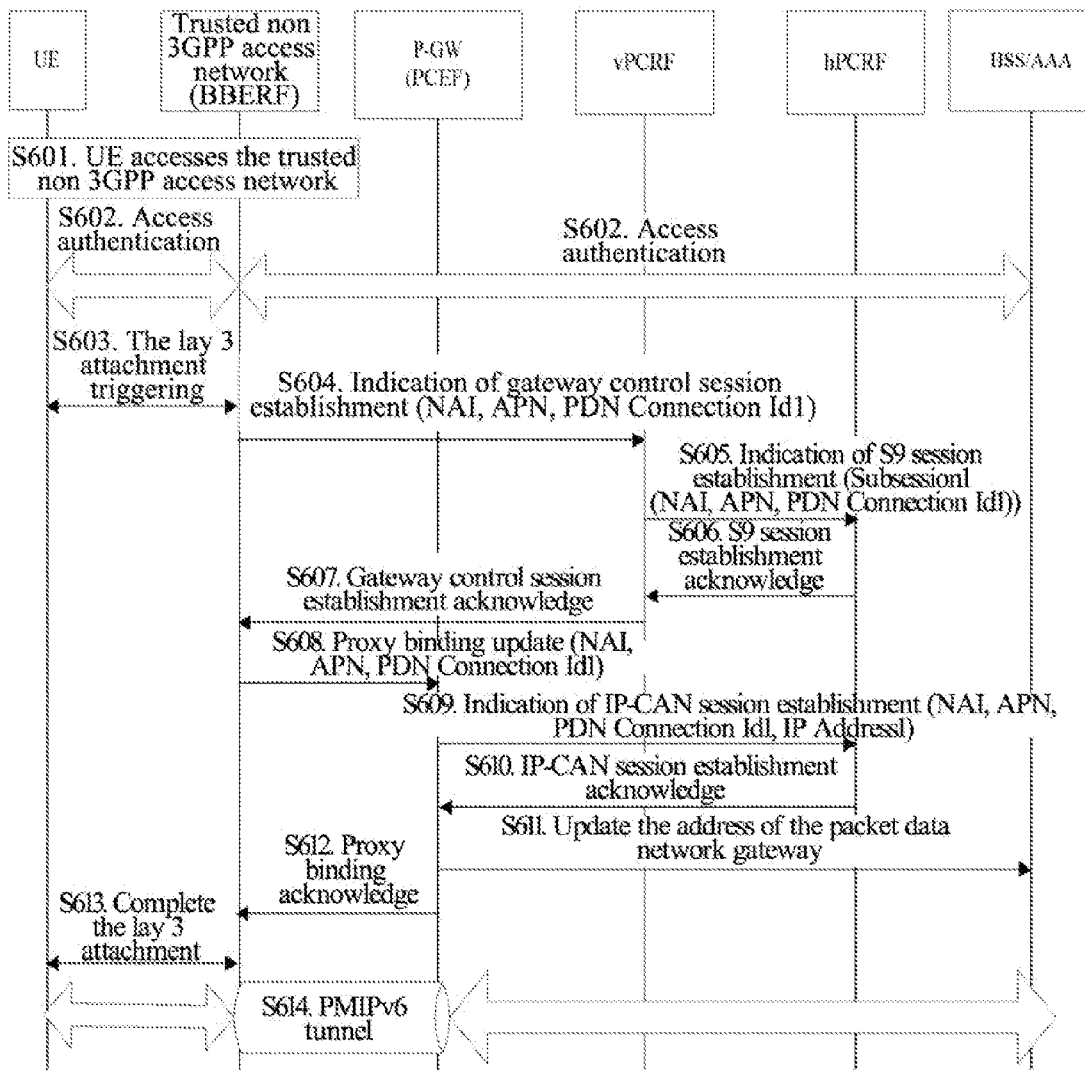
FIG. 6 is a flow chart of a UE accessing the same one APN through a trusted non 3GPP access gateway twice in a home routed roaming scenario according to the first embodiment of the present invention.
Figure 6B:
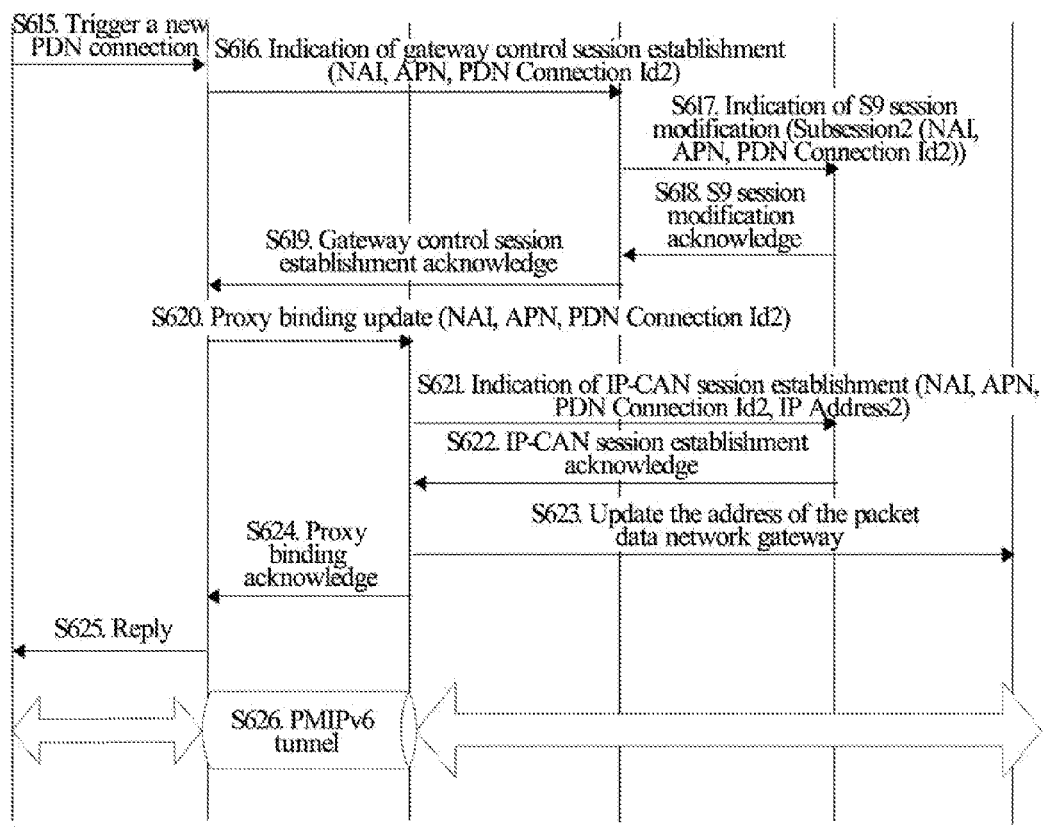

FIG. 6 is a flow chart of the UE accessing the same one APN through the trusted non 3GPP access gateway twice in the home routed roaming scenario according to the first embodiment of the present invention, wherein the PMIPv6 protocol is used between the access gateway and the P-GW, and the specific steps are as follows:

step S601, the UE accesses the trusted non 3GPP access network;

step S602, the UE makes a request for performing the EPS access authentication to the HSS/AAA through the trusted non 3GPP access network after the UE accesses the trusted non 3GPP access network; the HSS/AAA authenticates the UE which sends the request after receiving the EPS access authentication request; and the HSS/AAA sends the P-GW selection information of the UE and the UE subscribed APN, including the default APN, to the trusted non 3GPP access gateway after completing the authentication on the UE;

step S603, the layer 3 attachment flow is triggered after the authentication succeeds;

step S604, the trusted non 3GPP access gateway supports to establish multiple PDN connections to the single APN, and the trusted non 3GPP access gateway allocates the PDN Connection Id1 for uniquely differentiating the PDN connection to be established;

the BBERF residing in the trusted non 3GPP access gateway sends the indication message of gateway control session establishment to the visited PCRF (vPCRF), and the message carries the user identifier NAI, PDN identifier APN and the PDN Connection Id1; that message makes a request for establishing one gateway control session (the Gxx session), which is identified as the Gxx session1.

Step S605, the vPCRF determines that the user is a roaming user according to the user identifier NAI and the S9 session has not been established for the user; the vPCRF sends the indication message of S9 session establishment to the home PCRF (hPCRF) of the user, makes a request for establishing one subsession1 (Subsession1) in the S9 session, and the Subsession1 carries the user identifier NAI, PDN identifier APN and PDN Connection Id1; the vPCRF maintains the association relationship between the gateway control session established in step S604 and the Subsession1, namely the association relationship between the Gxx session1 and the Subsession1;

step S606, the hPCRF makes the PCC rule and QoS rule according to the user subscription information, network policy, and bearer attribute of the current access network and so on, and also may make the corresponding event trigger at the same time; the hPCRF returns the S9 session establishment acknowledge message to the vPCRF, and includes the made QoS rule in the Subsession1 to send to the vPCRF; these rules are not the policies regarding to the specific services, but are only some default policies;

step S607, the vPCRF returns the information in the Subsession1 to the BBERF through the gateway control session establishment acknowledge message;

step S608, the trusted non 3GPP access gateway selects the P-GW according to the P-GW selection information returned in step S602, sends a proxy binding update message to the selected P-GW, and the message carries the user identifier NAI, PDN identifier APN and the PDN Connection Id1;

step S609, the P-GW allocates the IP address, identified as IP Address1, for the PDN connection which is requested for establishing for the UE; since it is the home routed scenario, the P-GW is located at the home network; the PCEF residing in the P-GW sends an indication message of IP-CAN session establishment to the hPCRF, and the message carries the user identifier NAI, IP Address1, PDN identifier APN and PDN Connection Id1; that message makes a request for establishing one Gx session, which is identified as the Gx session1;

step S610, after receiving the indication message of IP-CAN session establishment, the hPCRF associates the indication message of IP-CAN session establishment with the previous indication message of S9 session establishment according to the user identifier NAI and the PDN identifier APN, and associates the Subsession1 in the S9 session with the IP-CAN session (Gx session1) established in the step S609 according to the PDN Connection Id1; at the same time, the hPCRF inquires the user subscription information and updates the previously made policies (including the QoS rules, PCC rules and the event trigger) according to the user subscription information, network policy and the bearer attribute of the access network and so on, the hPCRF sends the IP-CAN session establishment acknowledge message to the BBERF in the P-GW, and that message carries the PCC rule and the event trigger; these rules are not the policies regarding to the specific services, but are some default policies;

step S611, the PCEF in the P-GW installs and enforces the PCC rule and the event trigger carried in the IP-CAN session establishment acknowledge message after receiving the IP-CAN session establishment acknowledge message, and at the same time, the P-GW sends its own IP address to the HSS;

step S612, the P-GW returns the proxy binding acknowledge message to the trusted non 3GPP access gateway, and the message carries the IP address (IP Address1) allocated by the P-GW for this PDN connection established by the UE;

besides, if the QoS rule and the event trigger made in step S610 are different from those sent in step S606, then the hPCRF sends the updated QoS rule and the event trigger to the vPCRF through the Subsession1, and the vPCRF sends to the trusted non 3GPP access gateway through the Gxx session1; the trusted non 3GPP access gateway installs the QoS rule, and returns the acknowledge message.

Step S613, the layer 3 attachment is completed;

step S614, the PMIPv6 tunnel is established between the trusted non 3GPP access gateway and the P-GW, and the UE can send and receive data; the UE can access the dedicated service through this established PDN connection, and the PCRF also can make the corresponding policies for the resource reservation according to the characteristics of the accessed services; these policies can be considered as the dedicated policies of accessed services;

step S615, the UE decides to initiate to establish the second PDN connection to the default APN, the UE sends a request message for triggering the establishment of the new PDN connection to the trusted non 3GPP access gateway, and that message carries the PDN identifier APN;

step S616, the trusted non 3GPP access gateway allocates the PDN Connection Id2 for uniquely differentiating the second PDN connection to be established;

the BBERF residing in the trusted non 3GPP access gateway sends the indication message of gateway control session establishment to the vPCRF, and that message carries the user identifier NAI, PDN identifier APN and the PDN Connection Id2; that message makes a request for establishing one gateway control session (the Gxx session), which is identified as the Gxx session2;

step S617, the vPCRF determines that the user is the roaming user according to the user identifier NAI and the S9 session has been established for the user; the vPCRF sends the indication message of S9 session modification to the hPCRF, makes a request for establishing one Subsession2 in the S9 session, and the Subsession2 carries the user identifier NAI, PDN identifier APN and PDN Connection Id2; the vPCRF maintains the association relationship between the gateway control session (Gxx session2) established in step S616 and the Subsession2;

step S618, the hPCRF makes the PCC rule and QoS rule according to the user subscription information, the network policy, and the bearer attribute of the current access network and so on; and at the same time, also may make the corresponding event trigger; the hPCRF returns the S9 session modification acknowledge message to the vPCRF, and includes the made QoS rule and the event trigger in the Subsession2 to send to the vPCRF; these rules are not the policies regarding to the specific services, but are only some default policies;

step S619, the vPCRF returns the information in the Subsession2 to the BBERF through the gateway control session acknowledge message;

step S620, the trusted non 3GPP access gateway sends a proxy binding update message to the P-GW, and that message carries the user identifier NAI, PDN identifier APN and the PDN Connection Id2;

step S621, the P-GW allocates the IP address, identified as IP Address2, of the established second PDN connection for the UEs;

the PCEF residing in the P-GW sends an indication message of IP-CAN session establishment to the hPCRF, and that message carries the user identifier NAI, IP Address2, PDN identifier APN and PDN Connection Id2; that message makes a request for establishing one Gx session, which is identified as the Gx session2.

Step S622, after receiving the indication message of IP-CAN session establishment, the hPCRF associates the indication message of IP-CAN session establishment with the indication message of S9 session modification in step S617 according to the user identifier NAI and the PDN identifier APN, and associates the IP-CAN session (Gx session2) with the Subsession2 according to the PDN Connection Id2; at the same time, the hPCRF inquires the user subscription information and may update the previous made polices (including the QoS rules, the PCC rules and the event trigger) according to the user subscription information, the network policy and the bearer attribute of the access network and so on, the hPCRF sends the IP-CAN session establishment acknowledge message to the PCEF in the P-GW, and that message carries the PCC rule; these rules are not policies regarding to specific services, but are some default policies;

step S623, the PCEF in the P-GW installs and enforces the PCC rule carried in the IP-CAN session establishment acknowledge message after receiving the IP-CAN session establishment acknowledge message, and at the same time, the P-GW sends its own IP address to the HSS;

step S624, the P-GW returns the proxy binding acknowledge message to the trusted non 3GPP access gateway, and the message carries the IP address (IP Address2) allocated by the P-GW for the second PDN connection established by the UE;

besides, if the QoS rule and the event trigger made in step S622 are different from those are sent in step S618, then the hPCRF sends the updated QoS rule and the event trigger to the vPCRF through the Subsession2, and the vPCRF sends to the trusted non 3GPP access gateway through the Gxx session2; the trusted non 3GPP access gateway installs the QoS rule, and returns the acknowledge message.

Step S625, the trusted non 3GPP access gateway returns the reply message to the UE, and that message carries the IP Address2;

step S626, the second PMIPv6 tunnel is established between the trusted non 3GPP access gateway and the P-GW, and the UE can send and receive data; the UE will use the established second PDN connection to access some dedicated services in the subsequent flows, and the PCRF will make the corresponding policies used for the resource reservation according to the characteristics of the services; these policies can be considered as the dedicated policies of the accessed services.

When the UE accesses the EPC through the E-URTAN and the PMIPv6 protocol is used between the S-GW and the P-GW, the flow of establishing multiple PDN connections to one APN is similar to the above flow. The difference is that the MME will allocate one default bearer identifier for the default bearer of each PDN connection established by the UE, the MME sends that identifier to the S-GW, and the S-GW takes that identifier as the PDN Connection Id to send to the PCRF and P-GW for the association between the sessions.

Figure 7A:
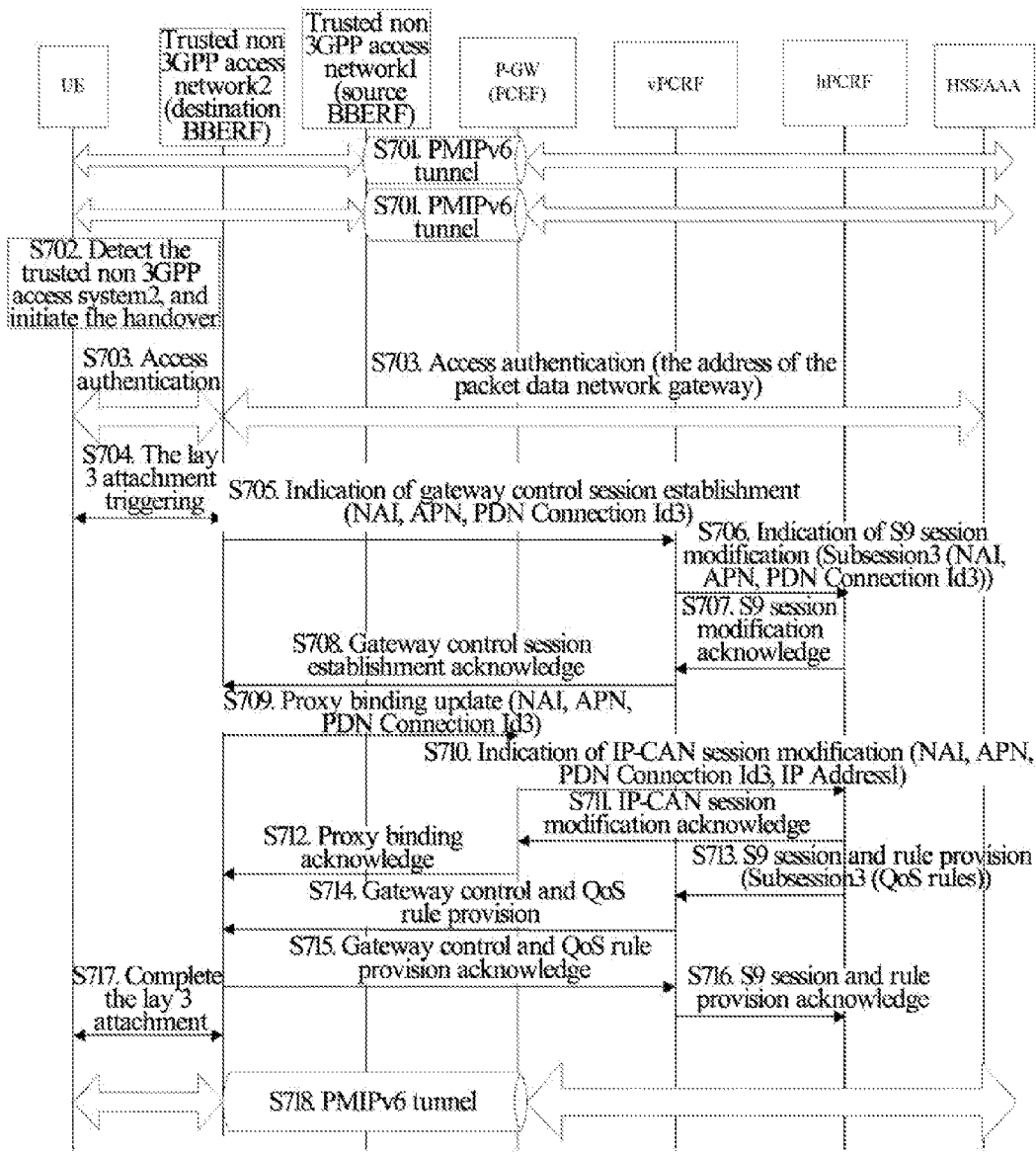
FIG. 7 is a flow chart of a handover occurring (that is, a BBERF relocation occurring) after the UE establishing two PDN connections to the same APN through the flow shown in FIG. 6 in a home routed roaming scenario according to the first embodiment of the present invention.
Figure 7B:
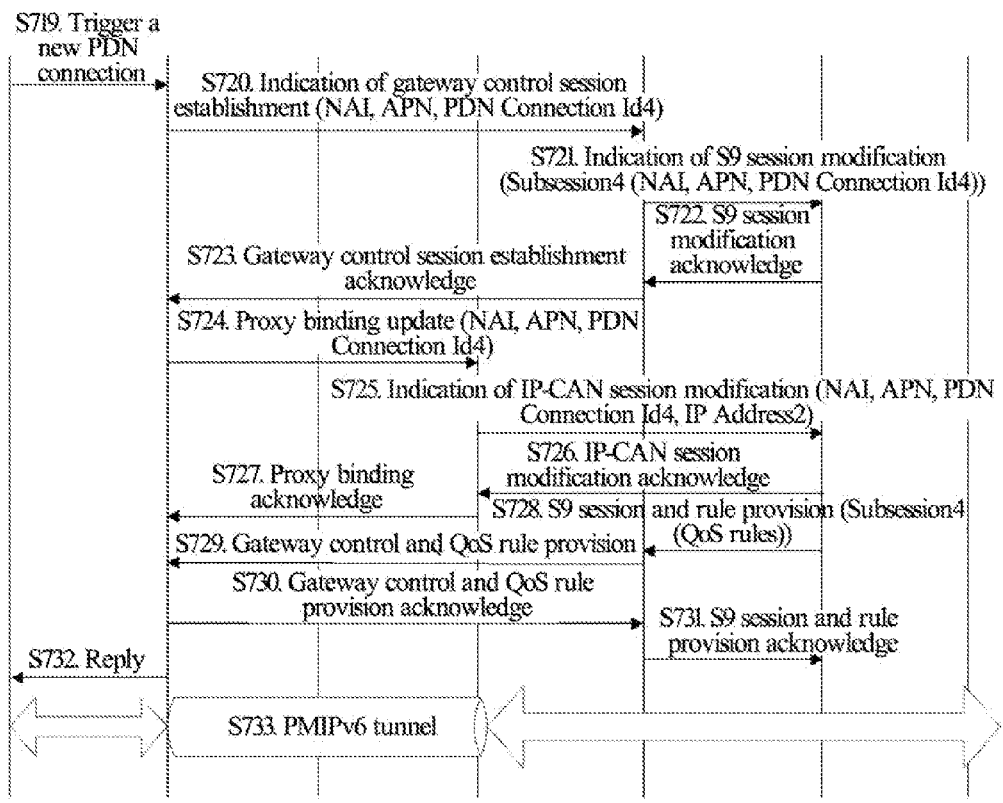

FIG. 7 is a flow chart of the handover occurring (that is, the BBERF relocation occurring) after the UE establishing two PDN connections to the same APN through the flow chart shown in FIG. 6 in the home routed roaming scenario according to the first embodiment of the present invention, wherein the PMIPv6 protocol is used between the access gateway and the P-GW, and the specific steps are as follows:

step S701, the UE gets access through the trusted non 3GPP access network1 and establishes two PDN connections to the APN, and the UE respectively accesses the respective dedicated services through two PDN connections; the hPCRF makes the dedicated PCC rule and QoS rule for each dedicated service for the resource reservation of the bearer layer;

step S702, the UE detects the trusted non 3GPP access network2, and decides to initiate the handover;

step S703, the UE makes a request for performing the EPS access authentication to the HSS/AAA through the trusted non 3GPP access network2 after the UE accesses the trusted non 3GPP access network2; the HSS/AAA authenticates the UE which sends the request after receiving the EPS access authentication request; and the HSS/AAA sends the address of the P-GW selected when the UE gets access through the trusted non 3GPP access network1 and the UE subscribed APN, including the default APN, to the trusted non 3GPP access gateway2 after completing the authentication on UE;

step S704, the layer 3 attachment flow is triggered after the authentication succeeds;

step S705, the trusted non 3GPP access gateway2 supports to establish multiple PDN connections to single APN, and the trusted non 3GPP access gateway2 allocates the PDN Connection Id3 for uniquely differentiating the PDN connection to be re-established;

the BBERF residing in the trusted non 3GPP access gateway2 sends the indication message of gateway control session establishment to the vPCRF, and the message carries the user identifier NAI, PDN identifier APN, the PDN Connection Id3 and the bearer attribute of the new access network (the IP-CAN type, RAT type, and the BBERF address); that message makes a request for establishing one gateway control session (the Gxx session), which is identified as the Gxx session3.

It should be noted that the trusted non 3GPP access gateway1 and the trusted non 3GPP access gateway2 do not interact information, thus the respectively allocated PDN Connection Ids are different;

step S706, the vPCRF determines that the handover of the user occurs according to the bearer attribute of the new access network, and finds out the information of the user before the handover (including the S9 session established before the handover) according to the user identifier NAI and the PDN identifier APN; however, since the PDN Connection Id3 is a new identifier, the vPCRF is unable to judge which PDN connection before the handover should be associated with the PDN Connection Id3 (that is, which Subsession in the S9 session before the handover is associated with), thus the vPCRF decides to newly establish one subsession; the vPCRF sends the indication message of S9 session modification to the hPCRF, makes a request for establishing the subsession (Subsession3), and includes the user identifier NAI, the PDN identifier, PDN Connection Id3 and the bearer attribute of the new access network into the Subsession3 to send to the hPCRF; the vPCRF maintains the association relationship between the Gxx session3 and the Subsession3;

step S707, the hPCRF is similarly unable to judge which PDN connection before the handover will be re-established by the UE, and thus the hPCRF is unable to send the dedicated policy related to a certain specific service accessed by the UE before the handover, and is only able to make the default QoS rules according to the information such as the user subscription information, the network policy and the bearer attribute of the new access network and so on, and includes these default QoS rules and event trigger into the Subsession3 to send to the vPCRF through the S9 session modification acknowledge message; certainly, the hPCRF may also only returns the acknowledge message without sending any rule;

step S708, if the S9 session modification acknowledge message in step S707 carries the QoS rule and event trigger, then the vPCRF sends the default QoS rule and the event trigger to the BBERF in the trusted non 3GPP access gateway2 through the gateway control establishment acknowledge message; the BBERF in the trusted non 3GPP access gateway2 installs the QoS rule and the event trigger;

step S709, the trusted non 3GPP access gateway2 sends a proxy binding update message to the P-GW, the message carries the user identifier NAI, PDN identifier APN and the PDN Connection Id3, and the step S709 can send the proxy binding update message just after receiving the message of step S704 instead of waiting for the acknowledge message of step S708;

step S710, the P-GW at which the PCEF resides decides to firstly re-establish the first PDN connection established in the source system for UE after receiving the proxy binding update message, thus the PCEF sends the indication message of IP-CAN session modification (that message modifies the first IP-CAN session established in the source system, namely the Gx session1) to the hPCRF, and the message carries the PDN Connection Id3; besides, that message can further carry the user identifier NAI, PDN identifier APN and IP Address1;

step S711, the hPCRF associates the Gx session1 with the Subsession3 according to the PDN Connection Id3, the user identifier NAI and the PDN identifier APN after receiving the IP-CAN session modification indication; the hPCRF may modify the PCC rule, QoS rule and event trigger (including the default policy and dedicated policy) of the first PDN connection which is established by the UE before the handover according to the information such as the bearer attribute of the new access network and so on, and sends the modified PCC rule and the event trigger to the PCEF in the P-GW through the IP-CAN session modification acknowledge message; the PCEF in the P-GW installs and enforces the PCC rule and the event trigger after receiving the IP-CAN session modification acknowledge message;

step S712, the P-GW returns the proxy binding acknowledge message to the trusted non 3GPP access gateway2, and the message carries the IP Address1;

step S713, the hPCRF includes the dedicated QoS rule and the event trigger of the dedicated service accessed by the UE through the first PDN before the handover into the Subsession3 to send to the vPCRF through the S9 session and rule provision message, and these policies may be modified in step S711;

step S714, the vPCRF sends the QoS rule and the event trigger in the Subsession3 to the BBERF in the trusted non 3GPP access gateway2 through the gateway control and the QoS rule provision message;

step S715, the BBERF in the trusted non 3GPP access gateway2 installs and enforces the QoS rule and the event trigger, and returns the gateway control and the QoS rule provision acknowledge message;

step S716, the vPCRF returns the S9 session and rule provision acknowledge message to the hPCRF;

step S717, the layer 3 attachment is completed;

step S718, the PMIPv6 tunnel is established between the trusted non 3GPP access gateway2 and P-GW, and the UE re-establishes the first PDN connection from the source system to the default APN; the UE can access the dedicated service which has been applied for accessing in this source system through this PDN connection;

step S719, the UE sends the triggering indication message to the trusted non 3GPP access gateway2, the message carries the APN and handover indication, and the handover indication is used for denoting to re-establish one PDN connection before the handover to the trusted non 3GPP access gateway2;

step S720, the trusted non 3GPP access gateway2 at which BBERF resides allocates PDN Connection Id4 for uniquely differentiating the PDN connection to be re-established;

the BBERF sends the indication message of gateway control session establishment, which carries the user identifier NAI, PDN identifier APN and PDN Connection Id4, to the vPCRF; and that message makes a request for establishing one gateway control session (Gxx session), which is identified is Gxx session4;

step S721, the vPCRF determines that the handover of the UE occurs, and finds out the information (including the S9 session established before the handover) before the handover of the user according to the user identifier NAI and PDN identifier APN; however, since the PDN Connection Id4 is a new identifier, the vPCRF is unable to judge which PDN connection before the handover should be associated with the PDN Connection Id4 (that is, which Subsession in the S9 session before the handover is associated with), and thus the vPCRF decides to newly establish one subsession; the vPCRF sends the indication message of S9 session modification to the hPCRF to make a request for newly establishing one subsession (Subsession4), and includes the user identifier NAI, PDN identifier, PDN Connection Id4 and the bearer attribute of the new access network into Subsession4 to send to the hPCRF; and the vPCRF maintains the association relationship between the Gxx session4 and the Subsession4;

step S722, the hPCRF is either unable to judge which PDN connection before the handover will be re-established by the UE, and thus the hPCRF is unable to send the dedicated policy related to a certain specific service accessed by the UE before the handover, and is only able to make the default QoS rules and event trigger according to the information such as the user subscription information, the network policy and the bearer attribute of the new access network and so on, and includes these default QoS rules and the event trigger into the Subsession4 to send to the vPCRF through the S9 session modification acknowledge message; certainly, the hPCRF also may only return the acknowledge message without sending any rule;

step S723, if the S9 session modification acknowledge message in step S722 carries the default QoS rule and the event trigger, then the vPCRF sends the default QoS rule and the event trigger to the BBERF in the trusted non 3GPP access gateway2 through the gateway control establishment acknowledge message; and the BBERF installs the QoS rule and the event trigger;

step S724, the trusted non 3GPP access gateway2 sends the proxy binding update message to the P-GW, and the message carries the user identifier NAI, the PDN identifier APN and the PDN Connection Id4, and the step S724 can send the proxy binding update message just after receiving the message of step S719 without waiting for the acknowledge message of the step S723;

step S725, the P-GW at which the PCEF resides decides to re-establish the second PDN connection which is established in the source system for the UE after receiving the proxy binding update message, thus the PCEF sends the indication message of IP-CAN session modification (that message modifies the second IP-CAN session established in the source system, namely the Gx session2) to the hPCRF, and that message carries the PDN Connection Id4; besides, the message can further carry the user identifier NAI, the PDN identifier APN and the IP Address2;

step S726, the hPCRF associates the Gx session2 with the Subsession4 according to the PDN Connection Id4, the user identifier NAI and the PDN identifier APN after receiving the indication message of IP-CAN session modification; the hPCRF may modify the PCC rule, the QoS rule and the event trigger (including the default policy and dedicated policy) of the second PDN connection which is established by the UE before the handover according to the information such as the bearer attribute of the new access network and so on, and sends the updated PCC rule and the event trigger to the PCEF in the P-GW through the IP-CAN session modification acknowledge message; the PCEF installs and enforces the PCC rule and the event trigger after receiving the IP-CAN session modification acknowledge message;

step S727, the P-GW returns the proxy binding acknowledge message to the trusted non 3GPP access gateway2, and the message carries the IP Address2;

step S728, the hPCRF includes the dedicated QoS rule and the event trigger of the specified service accessed by the UE through the second PDN connection before the handover into the Subsession4 to send to the vPCRF through the S9 session and rule provision message, and these policies may be modified in step S726;

step S729, the vPCRF sends the QoS rule and the event trigger in Subsession4 to the BBERF in the trusted non 3GPP access gateway2 through the gateway control and the QoS rule provision message;

step S730, the BBERF in the trusted non 3GPP access gateway2 installs and enforces the QoS rule and the event trigger, and returns the gateway control and the QoS rule provision acknowledge message;

step S731, the vPCRF returns the S9 session and rule provision acknowledge message to the hPCRF;

step S732, the trusted non 3GPP access gateway2 returns the reply message to the UE, and that reply message carries the IP Address2;

step S733, the PMIPv6 tunnel is further established between the trusted non 3GPP access gateway2 and P-GW, and the UE re-establishes the second PDN connection from the source system to the default APN; the UE can access the dedicated service which has been applied for accessing in the source system through this PDN connection.

The UE gets access by handing over from the trusted non 3GPP access network to the 3GPP access network (E-UTRAN), and in the 3GPP access system, the PMIPv6 protocol is used between the S-GW and the P-GW, and the handover flow of establishing multiple PDN connections to one APN is similar to the above flow; the difference is that the MME will allocate one default bearer identifier for the default bearer of each PDN connection established by the UE when the access is through the 3GPP access network, and the MME sends that identifier to the S-GW; and the S-GW takes that identifier as the PDN Connection Id to send to the PCRF and the P-GW for the association between the sessions.

The flow of the handover across the S-GW of the UE inside the 3GPP access is similar to this, and the difference is that the default bearer identifier allocated by the MME acts as the PDN Connection Id for uniquely identifying one PDN connection.

In the view of the PCC, all of these handover scenarios can be generally called as the BBERF relocation.

Embodiment 2

Local Breakout

Figure 8A:
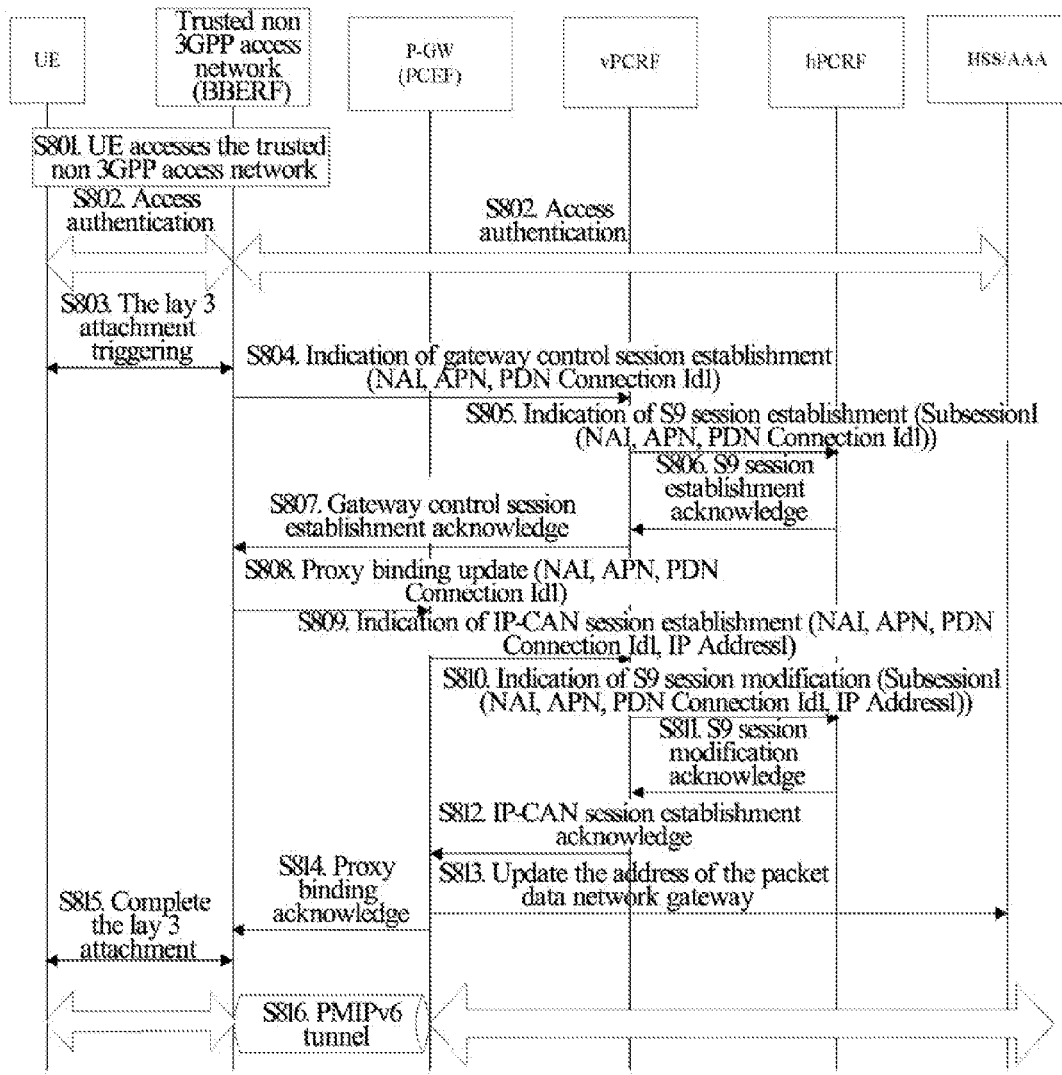
FIG. 8 is a flow chart of a UE accessing the same one APN through a trusted non 3GPP access gateway twice in a local breakout roaming scenario according to the second embodiment of the present invention.
Figure 8B:
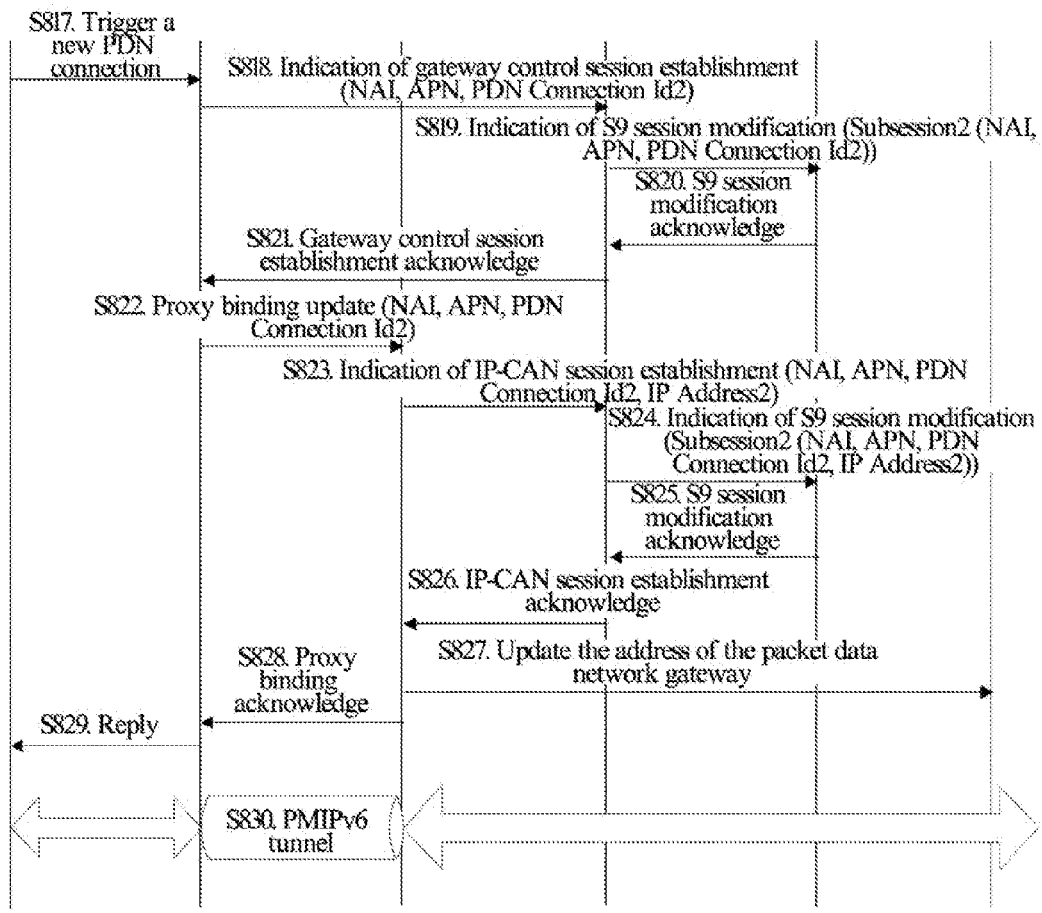

FIG. 8 is a flow chart of the UE accessing the same one APN through the trusted non 3GPP access gateway twice in the local breakout roaming scenario according to the second embodiment of the present invention, wherein the PMIPv6 protocol is used between the access gateway and the P-GW, and the specific steps are as follows:

step S801, the UE accesses the trusted non 3GPP access network;

step S802, the UE makes a request for performing the EPS access authentication to the HSS/AAA through the trusted non 3GPP access network after the UE accesses the trusted non 3GPP access network; the HSS/AAA authenticates the UE which sends the request after receiving the EPS access authentication request; and the HSS/AAA sends the P-GW selection information and the UE subscribed APN, including the default APN, to the trusted non 3GPP access gateway after completing the authentication on UE;

step S803, the layer 3 attachment flow is triggered after the authentication succeeds;

step S804, the trusted non 3GPP access gateway supports to establish multiple PDN connections to single APN, and the trusted non 3GPP access gateway allocates the PDN Connection Id1 for uniquely differentiating the PDN connection to be established;

the BBERF residing in the trusted non 3GPP access gateway sends the indication message of gateway control session establishment to the vPCRF, and the message carries the user identifier NAI, the PDN identifier APN and the PDN Connection Id1; that message makes a request for establishing one gateway control session (the Gxx session), which is identified as the Gxx session1;

step S805, the vPCRF judges that the user is a roaming user according to the user identifier NAI and the S9 session has not been established for the user; the vPCRF sends the indication message of S9 session establishment to the hPCRF, makes a request for establishing one Subsession1 in the S9 session, and the Subsession1 carries the user identifier NAI, the PDN identifier APN and PDN Connection Id1; the vPCRF maintains the association relationship between the gateway control session established in step S804 and the Subsession1, that is, the association relationship between the Gxx session1 and the Subsession1;

step S806, the hPCRF makes the PCC rule and QoS rule according to the user subscription information, the network policy, and the bearer attribute of the current access network and so on, and also may make the corresponding event trigger at the same time; the hPCRF returns the S9 session establishment acknowledge message to the vPCRF, and includes the made QoS rule in the Subsession1 to send to the vPCRF; these rules are not the policies regarding to the specific services, and are only some default policies;

step S807, the vPCRF returns the information in the Subsession1 to the BBERF through the gateway control session acknowledge message;

step S808, the trusted non 3GPP access gateway selects the P-GW according to the P-GW selection information returned in step S802, sends a proxy binding update message to the selected P-GW, and the message carries the user identifier NAI, the PDN identifier APN and the PDN Connection Id1;

step S809, the P-GW allocates an IP address, identified as IP Address1, of the PDN connection which is requested for establishing; since it is the local breakout scenario, the P-GW is located at the visited network; the PCEF residing in the P-GW sends an indication message of IP-CAN session establishment to the vPCRF, and the message carries the user identifier NAI, the IP Address1, the PDN identifier APN and the PDN Connection Id1; that message makes a request for establishing one Gx session, which is identified as the Gx session1;

step S810, after receiving the indication message of IP-CAN session establishment, the vPCRF associates the Gx session1, Gxx session1 established in step S804 and the sub-session (Subsession1) of the S9 session established in the step S805 according to the user identifier NAI, the PDN identifier APN and the PDN Connection Id1; the vPCRF sends the indication message of S9 session modification to the hPCRF, and carries the IP Address1 in the Subsession1; besides, the Subsession1 further can carries the user identifier NAI, the PDN identifier APN and the PDN Connection Id1;

step S811, the hPCRF records the above information carried in the Subsession1, and includes the PCC rule and the event trigger made in step S806 into the Subsession1 to return to the vPCRF; the hPCRF may update the previously made policies (including the QoS rules, the PCC rules and the event trigger); these rules are not policies regarding to specific services, but are some default policies;

step S812, the vPCRF returns the PCC rule and the event trigger included in the Subsession1 to the PCEF in the P-GW through the IP-CAN session establishment acknowledge message;

step S813, the PCEF in the P-GW installs and enforces the PCC rule and the event trigger carried in the IP-CAN session establishment acknowledge message after receiving the IP-CAN session establishment acknowledge message, and at the same time, the P-GW sends its own IP address to the HSS:

step S814, the P-GW returns the proxy binding acknowledge message to the trusted non 3GPP access gateway, and the message carries the IP address (IP Address1) allocated by the P-GW for this PDN connection established by the UE;

besides, if the QoS rule and the event trigger made in step S811 are different from those sent in step S806, then the hPCRF sends the updated QoS rule and the event trigger to the vPCRF through the Subsession1, and the vPCRF sends down to the trusted non 3GPP access gateway through the Gxx session1; the trusted non 3GPP access gateway installs the QoS rule, and returns the message for confirmation.

Step S815, the layer 3 attachment is completed;

step S816, the PMIPv6 tunnel is established between the trusted non 3GPP access gateway and the P-GW, and the UE can send and receive data; the UE can access the dedicated service through this established PDN connection, and the PCRF also can make the corresponding policies for the resource reservation according to the characteristics of the accessed services; these policies can be considered as the dedicated policies of accessed services;

step S817, the UE decides to initiate to establish the second PDN connection to the default APN, the UE sends a request message for triggering the establishment of the new PDN connection to the trusted non 3GPP access gateway, and the message carries the default APN;

step S818, the trusted non 3GPP access gateway allocates the PDN Connection Id2 for uniquely differentiating the second PDN connection to be established;

the BBERF residing in the trusted non 3GPP access gateway sends the indication message of gateway control session establishment to the vPCRF, the message carries the user identifier NAI, the PDN identifier APN and the PDN Connection Id2, and that message makes a request for establishing one gateway control session (the Gxx session), which is identified as the Gxx session2;

step S819, the vPCRF determines that the user is a roaming user according to the user identifier NAI and the S9 session has been established for the user; the vPCRF sends the indication message of S9 session modification to the hPCRF, makes a request for establishing one subsession (Subsession2) in the S9 session, and the Subsession2 carries the user identifier NAI, the PDN identifier APN and the PDN Connection Id2; the vPCRF maintains the association relationship between the gateway control session (Gxx session2) established in step S818 and the Subsession2;

step S820, the hPCRF makes the PCC rule and QoS rule according to the user subscription information, the network policy, and the bearer attribute of the current access network and so on, and at the same time, also may make the corresponding event trigger; the hPCRF returns the S9 session modification acknowledge message to the vPCRF, and includes the made QoS rule and the event trigger in the Subsession2 to send to the vPCRF; these rules are not the policies regarding to the specific services, but are only some default policies;

step S821, the vPCRF returns the information in the Subsession2 to the BBERF through the gateway control session acknowledge message;

step S822, the trusted non 3GPP access gateway sends a proxy binding update message to the P-GW, and the message carries the user identifier NAI, the PDN identifier APN and the PDN Connection Id2;

step S823, the P-GW allocates the IP address (IP Address2) of the second PDN connection established for the UE;

the PCEF residing in the P-GW sends an indication message of IP-CAN session establishment to the vPCRF, and the message carries the user identifier NAI, the IP Address2, the PDN identifier APN and the PDN Connection Id2; that message makes a request for establishing one Gx session, which is identified as the Gx session2;

step S824, after receiving indication message of the IP-CAN session establishment, the vPCRF associates the Gx session2 with Gxx session2 established in step S818 and the subsession Subsession2 of the S9 session established in step S819 according to the user identifier NAI, the PDN identifier APN and the PDN Connection Id2; the vPCRF sends the indication message of S9 session modification to the hPCRF, and includes the IP Address2 into the Subsession2 to send to the hPCRF; besides, the vPCRF can further include the user identifier NAI, the PDN identifier APN and the PDN Connection Id2 into the Subsession2 to send to the hPCRF;

step S825, the hPCRF records the above information carried in the Subsession2, and includes the PCC rule and the event trigger made in step S820 into the Subsession2 to return to the vPCRF; the hPCRF may update the previously made policies (the QoS rules, the PCC rules and the event trigger), and these rules are not policies regarding to specific services, but only some default policies;

step S826, the vPCRF returns the PCC rule carried in the Subsession2 to the PCEF in the P-GW through the IP-CAN session establishment acknowledge message;

step S827, the PCEF in the P-GW installs and enforces the PCC rule carried in the IP-CAN session establishment acknowledge message after receiving the IP-CAN session establishment acknowledge message, and at the same time, the P-GW sends its own IP address to the HSS;

step S828, the P-GW returns the proxy binding acknowledge message to the trusted non 3GPP access gateway, and the message carries the IP address (IP Address2) allocated by the P-GW for the second PDN connection established by the UE;

besides, if the QoS rule and the event trigger made in step S825 are different from those sent in step S820, then the hPCRF sends the updated QoS rule and the event trigger to the vPCRF through the Subsession2, and the vPCRF sends down to the trusted non 3GPP access gateway through the Gxx session2; the trusted non 3GPP access gateway installs the QoS rule, and returns the acknowledge message.

Step S829, the trusted non 3GPP access gateway returns the reply message, which carries the IP Address2, to the UE;

step S830, the second PMIPv6 tunnel is established between the trusted non 3GPP access gateway and the P-GW, and the UE can send and receive data; the UE will use the established second PDN connection to access some dedicated services in the subsequent flows, and the PCRF will make the corresponding policies for the resource reservation according to the characteristics of the services; these policies can be considered as the dedicated policies of accessed services.

In other embodiments of the present invention, the hPCRF only makes the PCC rule without making the QoS rule; in this case, the vPCRF makes the corresponding QoS rule according to the PCC rule sent by the hPCRF, and sends to the corresponding BBERF. For example, the hPCRF makes the PCC rule for each PDN connection (namely each IP-CAN session) established through the trusted non 3GPP access by the UE, and sends the PCC rule down to the vPCRF, the vPCRF makes the QoS rule according to the PCC rule, and sends the QoS rule down to the BBERF in the trusted non 3GPP access gateway.

When the UE accesses the EPC through the E-URTAN and the PMIPv6 protocol is used between the S-GW and P-GW, the flow of establishing multiple PDN connections to one APN is similar to the above flow. The difference is that the MME will allocate one default bearer identifier for the default bearer of each PDN connection established by the UE, and the MME sends the identifier to the S-GW; and the SGW takes this identifier as the PDN Connection Id to send to the PCRF and P-GW for the association between sessions.

Figure 9A:
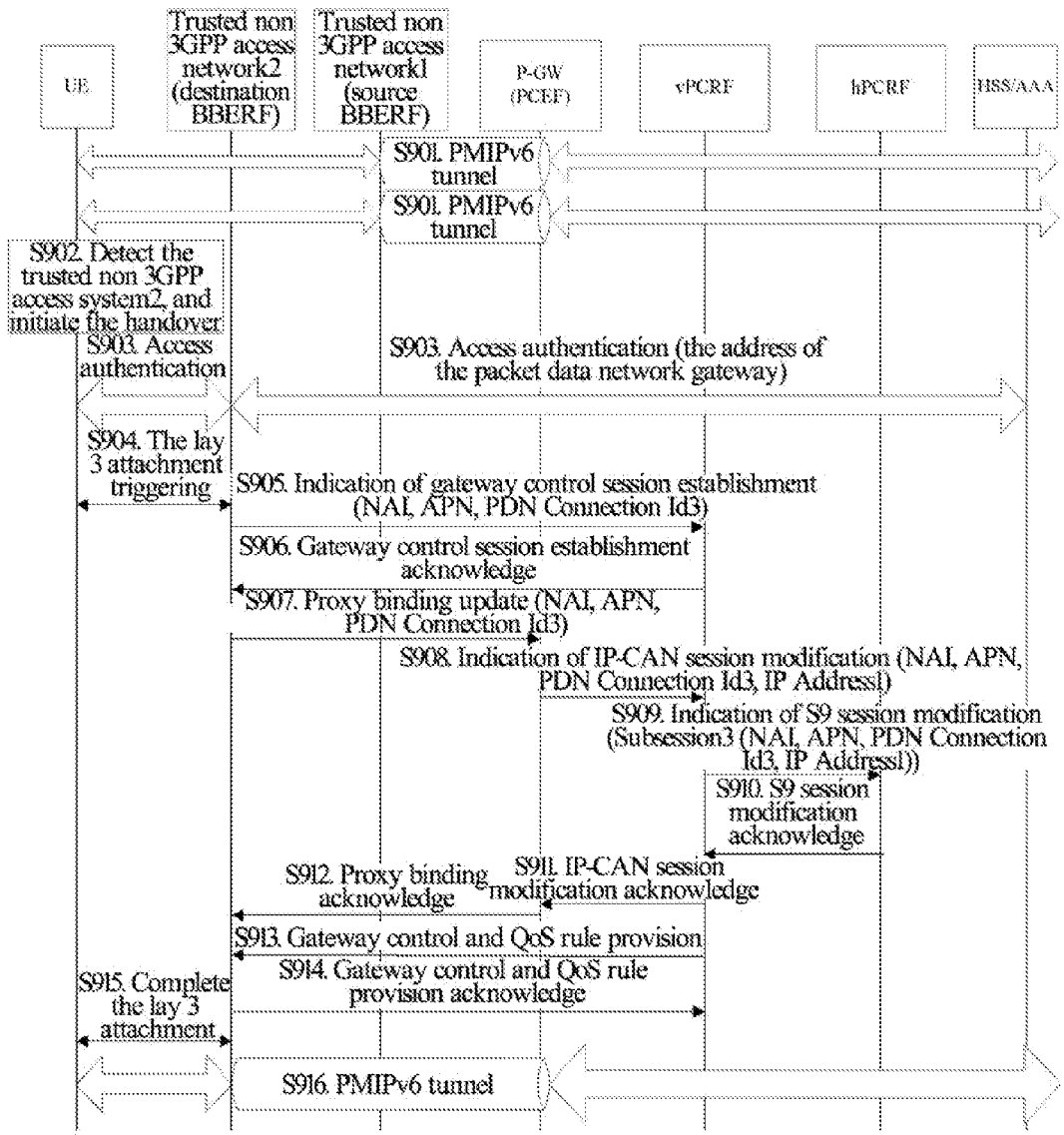
FIG. 9 is a flow chart of a handover occurring (that is, a BBERF relocation occurring) after the UE establishing two PDN connections to the same APN through the flow shown in FIG. 8 in a local breakout roaming scenario according to the second embodiment of the present invention.
Figure 9B:
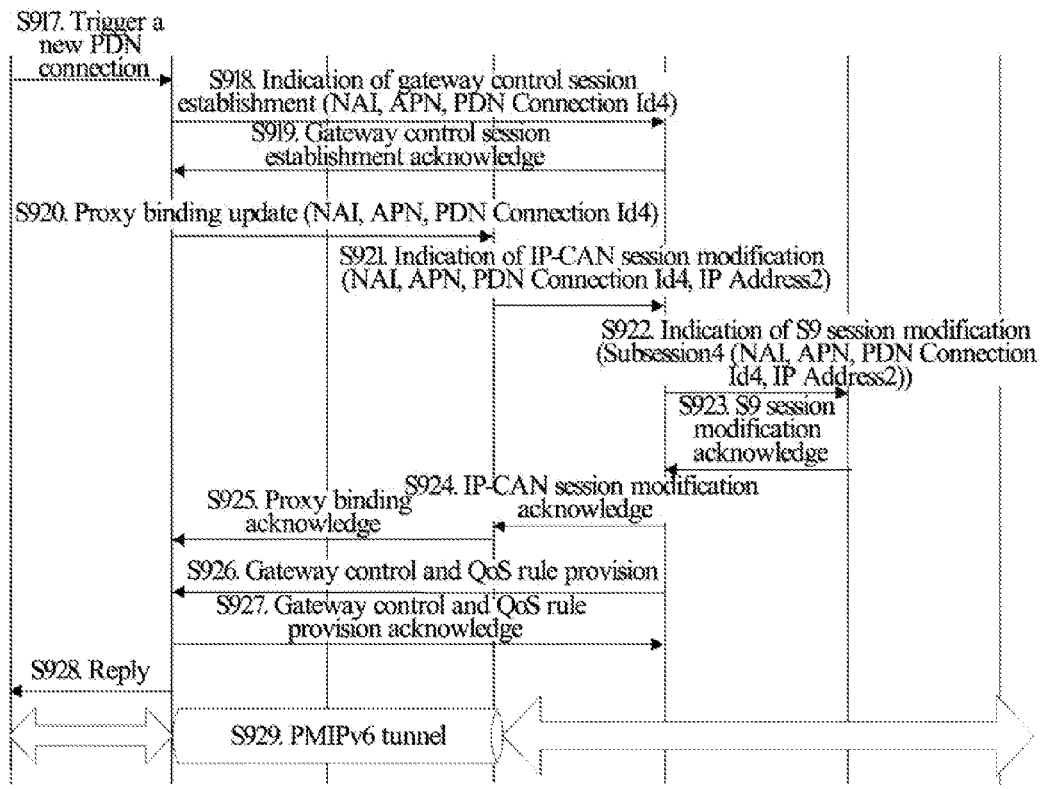

FIG. 9 is a flow chart of the handover occurring (that is, BBERF relocation occurring) after the UE establishing two PDN connections to the same APN through the flow chart shown in FIG. 8 in the local breakout roaming scenario according to the second embodiment of the present invention; wherein the PMIPv6 protocol is used between the access gateway and the P-GW, and the specific steps are as follows:

step S901, the UE gets access through the trusted non 3GPP access network1 and establishes two PDN connections to the APN, and UE respectively accesses respective dedicated services through two PDN connections; the hPCRF makes the dedicated PCC rule and QoS rule for respective dedicated services for the resource reservation of the bearer layer;

step S902, the UE detects the trusted non 3GPP access network2, and decides to initiate the handover;

step S903, the UE makes a request for performing the EPS access authentication to the HSS/AAA through the trusted non 3GPP access network after the UE accesses the trusted non 3GPP access network2; the HSS/AAA authenticates the UE which sends the request after receiving the EPS access authentication request; and the HSS/AAA sends the P-GW address selected by the UE getting access through the trusted non 3GPP network1 and the user subscribed APN, including the default APN, to the trusted non 3GPP access gateway2 after completing the authentication on UE;

step S904, the layer 3 attachment flow is triggered after the authentication succeeds;

step S905, the trusted non 3GPP access gateway2 supports to establish multiple PDN connections to single APN, and the trusted non 3GPP access gateway2 allocates the PDN Connection Id3 for uniquely differentiating the PDN connection to be re-established;

the BBERF residing in the trusted non 3GPP access gateway2 sends the indication message of gateway control session establishment to the vPCRF, and the message of carries the user identifier NAI, the PDN identifier APN, the PDN Connection Id3, and the bearer attribute of the new access gateway, and that message makes a request for establishing one gateway control session, which is identified as the Gxx session3.

It should be noted that the trusted non 3GPP access gateway1 and the trusted non 3GPP access gateway2 do not interact information, thus the respectively allocated PDN Connection Ids are different;

step S906, the vPCRF determines that handover of the UE occurs according to the bearer attribute of the new access network, and the information of the user before the handover (including the S9 session established before the handover) is found out according to the user identifier NAI and the PDN identifier APN; however, since the PDN Connection Id3 is a new identifier, the vPCRF is unable to judge which PDN connection before the handover should be associated with the PDN Connection Id3 (that is, which Subsession in the S9 session before the handover is associated with), thus the vPCRF sends the QoS rule and the event trigger to the BBERF in the trusted non 3GPP access gateway2 through the gateway control session establishment acknowledge message after performing the corresponding modification on the default policies (including the default PCC rule or the default QoS rule) sent by the hPCRF in the flow shown in FIG. 8 according to the bearer attribute of the new access network;

step S907, the trusted non 3GPP access gateway2 sends the binding update message to the P-GW, and the message carries the user identifier, the PDN identifier APN and the PDN Connection Id3, and the step S907 can send just after receiving the message of step S904 without waiting for the acknowledge message of the step S906;

step S908, the P-GW at which the PCEF resides decides to re-establish the first PDN connection established in the source system for UE firstly after receiving the proxy binding update message, thus the PCEF sends the indication message of IP-CAN session modification (that message modifies the first IP-CAN session established by the source system, namely Gx session1) to the vPCRF, and the message carries the PDN Connection Id3; besides, the message can further carry the user identifier NAI, the PDN identifier APN and the IP Address1;

step S909, the vPCRF sends the indication message of S9 session modification to the hPCRF to make a request for establishing a new subsession (Subsession3) of the S9 session, and the vPCRF includes the user identifier NAI, the PDN identifier APN, the IP address1, the PDN Connection Id3 and the bearer attribute of the new access network into the Subsession3 to send to the hPCRF; the vPCRF associates the Gx session1 with Gxx session3 established in step S905 according to the user identifier NAI, the PDN identifier APN and the PDN Connection Id3; and the vPCRF maintains the association relationship among the Gx session1 and the Subsession3 as well as Gxx session3;

step S910, after receiving the indication message of S9 session modification, the hPCRF determines that the first PDN connection established by the UE before the handover should be re-established according to the IP Address1; the hPCRF may update the PCC rule, QoS rule and the event trigger (including the default policy and dedicated policy) of the first PDN connection established by the UE before the handover according to the information such as the bearer attribute of the new access network and so on, and includes the PCC rule, the QoS rule and the event trigger into the Subsession3 to send to the vPCRF through the S9 session modification acknowledge message;

step S911, the vPCRF sends the PCC rule and the event trigger in Subsession3 to the PCEF in the P-GW through the IP-CAN session modification acknowledge message of Gx session1, and the PCEF installs and enforces the PCC rule and the event trigger;

step S912, the P-GW returns the proxy binding acknowledge message to the trusted non 3GPP access gateway2, and the acknowledge message carries the IP Address1;

step S913, the vPCRF sends the QoS rule and the event trigger in Subsession3 to the BBERF in the trusted non 3GPP access gateway2 through the gateway control and QoS rule provision message;

step S914, the BBERF in the trusted non 3GPP access gateway2 installs and enforces the QoS rule and the event trigger, and returns the gateway control and QoS rule provision acknowledge message;

step S915, the layer 3 attachment is completed;

step S916, the PMIPv6 tunnel is established between the trusted non 3GPP access gateway2 and the P-GW, and the UE re-establishes the first PDN connection from the source system to the default APN; the UE can access the dedicated service which has been applied for accessing in the source system through this PDN connection;

step S917, the UE sends the triggering indication message to the trusted non 3GPP access gateway2, the message carries the APN and the handover indication, and the handover indication is used for denoting to re-establish one PDN connection before the handover to the trusted non 3GPP access gateway2;

step S918, the trusted non 3GPP access gateway2 at which the BBERF resides allocates PDN Connection Id4 for uniquely differentiating the PDN connection to be re-established;

the BBERF sends the indication message of gateway control session establishment, which carries the user identifier NAI, the PDN identifier APN and the PDN Connection Id4, to the vPCRF; and that message makes a request for establishing one gateway control session (Gxx session), which is identified as Gxx session4.

Step S919, the vPCRF determines that the handover of the UE occurs, and finds out the information of the user before the handover (including the S9 session established before the handover) according to the user identifier NAI and the PDN identifier APN, however, since the PDN Connection Id4 is a new identifier, the vPCRF is unable to judge the which PDN connection before the handover should be associated with PDN Connection Id4 (that is, which Subsession in the S9 session before the handover is associated with), and thus the vPCRF sends the QoS rule and the event trigger to the BBERF in the trusted non 3GPP access gateway2 through the gateway control session establishment acknowledge message after performing the corresponding modification on the default policies (including the default PCC rule or the default QoS rule) sent by the hPCRF in the flow shown in FIG. 8 according to the bearer attribute of the new access network;

step S920, the trusted non 3GPP access gateway2 sends the proxy binding update message to the P-GW, and the message carries the user identifier NAI, the PDN identifier APN and the PDN Connection Id4, and the step S920 can send just after receiving the message of step S917 without waiting for the acknowledge message of the step S919;

step S921, the P-GW at which the PCEF resides decides to re-establish the second PDN connection which is established in the source system for the UE after receiving the proxy binding update message, thus the PCEF sends the indication message of IP-CAN session modification (that message modifies the second IP-CAN session established in the source system, namely Gx session2) to the vPCRF, and that message carries the PDN Connection Id4; besides, the message can further carry the user identifier NAI, the PDN identifier APN and the IP Address2;

step S922, the vPCRF sends the indication message of S9 session modification to the hPCRF to makes a request for establishing a new subsession (Subsession4), and includes the user identifier NAI, the PDN identifier APN, the IP address2 and PDN Connection Id4 into the Subsession4 to send to the hPCRF; the vPCRF associates the Gx session2 with the Gxx session4 established in step S918 according to the user identifier NAI, the PDN identifier APN and the PDN Connection Id4; the vPCRF maintains the association relationship among the Gx session2 and Subsession4 as well as Gxx session4;

step S923, the hPCRF receives the indication message of S9 session modification, and determines that the second PDN connection established by the UE before the handover should be re-established according to the IP Address2; the hPCRF may update the PCC rule, the QoS rule and the event trigger (including the default policy and dedicated policy) of the second PDN connection which is established by the UE before the handover according to the information such as the bearer attribute of the new access network and so on, and includes the PCC rule, the QoS rule and the event trigger into the Subsession4 to send to the vPCRF through the S9 session modification acknowledge message;

step S924, the vPCRF sends the PCC rule and the event trigger in Subsession4 to the PCEF in the P-GW through the IP-CAN session modification acknowledge message of the Gx session2, and the PCEF installs and enforces the PCC rule and the event trigger;

step S925, the P-GW returns the proxy binding acknowledge message to the trusted non 3GPP access gateway2, and the message carries the IP Address2;

step S926, the vPCRF sends the QoS rule and the event trigger in Subsession4 to the BBERF in the trusted non 3GPP access gateway2 through the gateway control and QoS rule provision message;

step S927, the BBERF in the trusted non 3GPP access gateway2 installs the QoS rule and the event trigger, and returns the gateway control and QoS rule provision acknowledge message;

step S928, the trusted non 3GPP access gateway2 returns the reply message to the UE, and that message carries the IP Address2;

step S929, one PMIPv6 tunnel is further established between the trusted non 3GPP access gateway2 and the P-GW, and the UE re-establishes the second PDN connection from the source system to the default APN; the UE can access the dedicated service which has been applied for accessing in the source system through this PDN connection.

In other embodiments of the present invention, the hPCRF only makes the PCC rule without making the QoS rule; in this case, the vPCRF makes the corresponding QoS rule according to the PCC rule sent by the hPCRF, and sends the QoS rule down to the corresponding BBERF. For example, the hPCRF makes the PCC rule for each PDN connection (namely each IP-CAN session) established by the UE through the trusted non 3GPP access, and sends the PCC rule down to the vPCRF, the vPCRF makes the QoS rule according to the PCC rule, and sends the QoS rule down to the BBERF in the trusted non 3GPP access gateway.

The UE is handed over from the trusted non 3GPP access network to the 3GPP access (E-UTRAN), and in the 3GPP access system, the PMIPv6 protocol is used between the S-GW and P-GW, and the handover flow of establishing multiple PDN connections to one APN is similar to the above flow; the difference is that when getting access through the 3GPP access network, the MME will allocate one default bearer identifier for the default bearer of each PDN connection established by the UE, and the MME sends that identifier to the S-GW; the S-GW takes that identifier as the PDN Connection Id to send to the PCRF and the P-GW for the association between the sessions.

The flow of the handover across the S-GW of the UE inside the 3GPP access is similar to this, and the difference is that the default bearer identifier allocated by the MME acts as the PDN Connection Id for uniquely identifying one PDN connection.

In the view of the PCC, all of these handover scenarios can be generally called as the BBERF relocation.

INDUSTRIAL APPLICABILITY

The present invention implements the method for performing policy and charging control on multiple PDN connections established to one APN in the roaming scenarios of the home routed and local breakout, which makes up for the deficiencies in the related art.

What is claimed is:

1. A method for performing policy and charging control in a roaming scenario, comprising:
a User Equipment (UE) accessing a first access network, establishing a Packet Data Network (PDN) connection for the UE;
establishing a first gateway control session, a Gx session, an S9 session and a first subsession of the S9 session for performing a policy and charging control on said PDN connection, wherein the Gx session is associated with the first subsession of the S9 session; and
in a process of a Bearer Binding and Event Report Function (BBERF) relocation in handover of the UE from the first access network to a second access network:
a destination BBERF in the second access network sending an indication message of gateway control session establishment, which includes a user identifier, a PDN identifier and a PDN connection identifier for uniquely identifying said PDN connection, to a visited Policy and Charging Rule Function (PCRF) so as to establish a second gateway control session; after receiving the indication message of gateway control session establishment, said visited PCRF sending a request message, which includes said user identifier, said PDN identifier and said PDN connection identifier, to a home PCRF so as to establish a second subsession of said S9 session, and associating said second subsession of said S9 session with said second gateway control session;

a gateway at which said destination BBERF resides sending a proxy binding update message, which includes said user identifier, said PDN identifier and said PDN connection identifier, to a gateway at which a Policy and Charging Enforcement Function (PCEF) resides; after receiving the proxy binding update message, said PCEF sending an indication message of IP Connectivity Access Network (IP-CAN) session modification, which includes said user identifier, said PDN identifier and said PDN connection identifier, to said home PCRF so as to modify said Gx session; and after receiving said indication message of IP-CAN session modification, said home PCRF associating said Gx session with said second subsession of said S9 session according to said user identifier, said PDN identifier and said PDN connection identifier;

wherein the method is able to implement policy and charging control for multiple PDN connections of the UE to one same Access Point Name (APN) in the roaming scenario with BBERF relocation.

2. The method of claim 1, after the step of associating said Gx session with said second subsession, further comprising:

said home PCRF modifying policies of the PDN connection corresponding to said Gx session according to a bearer attribute of the second access network, sending a Policy and Charging Control (PCC) rule in the modified policies to the PCEF through said Gx session, and sending a Quality of Service (QoS) rule in the modified policies to the visited PCRF through said second subsession, and the visited PCRF sending said QoS rule to the destination BBERF through said second gateway control session.

3. The method of claim 1, further comprising:

after receiving an indication message of S9 session modification, said home PCRF sending a default QoS rule made for a user to the visited PCRF through an S9 session modification acknowledge message of said second subsession, and the visited PCRF sending the default QoS rule to the destination BBERF through a gateway control session establishment acknowledge message of said second gateway control session.

4. A method for performing policy and charging control in a roaming scenario, comprising:

a User Equipment (UE) accessing a first access network, establishing a Packet Data Network (PDN) connection for the UE;

establishing a first gateway control session, a Gx session, an S9 session and a first subsession of the S9 session for performing a policy and charging control on said PDN connection, wherein the Gx session is associated with the first subsession of the S9 session; and in a process of a Bearer Binding and Event Report Function (BBERF) relocation in handover of the UE from the first access network to a second access network:

a destination BBERF in the second access network sending an indication message of gateway control session establishment, which includes a user identifier, a PDN identifier and a PDN connection identifier for uniquely identifying said PDN connection, to a visited Policy and Charging Rule Function (PCRF) so as to establish a second gateway control session;

a gateway at which said destination BBERF resides sending a proxy binding update message, which includes said user identifier, said PDN identifier and said PDN connection identifier, to a gateway at which a Policy and Charging Enforcement Function (PCEF) resides;

after receiving the proxy binding update message, said PCEF sending an indication message of IP Connectivity Access Network (IP-CAN) session modification, which includes said user identifier, said PDN identifier and said PDN connection identifier, to said visited PCRF; and after receiving said indication message of IP-CAN session modification, said visited PCRF establishing a second subsession of said S9 session with a home PCRF, and associating said second subsession of said S9 session with said Gx session and said second gateway control session according to said user identifier, said PDN identifier and said PDN connection identifier;

wherein the method is able to implement policy and charging control for multiple PDN connections of the UE to one same Access Point Name (APN) in the roaming scenario with BBERF relocation.

5. The method of claim 4, wherein, in the step of said visited PCRF establishing the second subsession of said S9 session with said home PCRF, the visited PCRF establishing said second subsession by sending an indication message of S9 session modification to the home PCRF; and the indication message of S9 session modification includes an IP address of the PDN connection corresponding to said Gx session.

6. The method of claim 5, further comprising:

after receiving said indication message of S9 session modification, said home PCRF modifying policies of the PDN connection corresponding to said IP address, and including the modified policies into an S9 session modification acknowledge message to send to the visited PCRF; and after receiving said S9 session modification acknowledge message, said visited PCRF sending a Policy and Charging Control (PCC) rule in the modified policies to the PCEF through said Gx session, and sending a Quality of Service (QoS) rule in the modified policies to the destination BBERF through said second gateway control session.

7. The method of claim 5, further comprising:

after receiving said indication message of S9 session modification, said home PCRF modifying the PCC rule of the PDN connection corresponding to said IP address, and including the modified PCC rule into an S9 session modification acknowledge message to send to the visited PCRF; and after receiving said S9 session modification acknowledge message, said visited PCRF sending the modified PCC rule to the PCEF through said Gx session, making a Quality of Service (QoS) rule according to said PCC rule, and sending the made QoS rule to the destination BBERF through said second gateway control session.

8. The method of claim 4, wherein, said indication message of gateway control session establishment further includes a bearer attribute of the second access network; and said method further comprises:

after receiving said indication message of gateway control session establishment, said visited PCRF searching a default QoS rule corresponding to said user identifier and said PDN identifier, modifying said default QoS rule according to said bearer attribute of the second access network, and then sending to the destination BBERF through a gateway control session establishment acknowledge message.

9. The method of claim 1, wherein the step of establishing the first gateway control session, the Gx session, the S9 session and the first subsession of the S9 session for performing the policy and charging control on said PDN connection comprises:

a BBERF sending an indication message of gateway control session establishment, which includes a user identifier, a PDN identifier and a PDN connection identifier for uniquely identifying the PDN connection, to the visited PCRF so as to establish the first gateway control session;

after receiving the indication message of gateway control session establishment, said visited PCRF sending an indication message of S9 session establishment or an indication message of S9 session modification, which includes said user identifier, said PDN identifier and said PDN connection identifier, to the home PCRF so as to establish the first subsession of the S9 session, and associating said first subsession with said first gateway control session;

a gateway at which said BBERF resides sending a proxy binding update message, which includes said user identifier, said PDN identifier and said PDN connection identifier, to the gateway at which the PCEF resides;

after receiving the proxy binding update message, said PCEF sending an indication message of IP-CAN session establishment, which includes said user identifier, said PDN identifier and said PDN connection identifier, to the home PCRF so as to establish the Gx session; and after receiving said indication message of IP-CAN session establishment, said home PCRF associating said Gx session with said first subsession according to said user identifier, said PDN identifier and said PDN connection identifier.

10. The method of claim 9, further comprising:

after receiving said indication message of S9 session establishment or the indication message of S9 session modification, said home PCRF including a default Quality of Service (QoS) rule made for a user into an S9 session establishment acknowledge message or an S9 session modification acknowledge message to send to said visited PCRF; said visited PCRF including said default QoS rule into a gateway control session establishment acknowledge message to send to said BBERF; and after receiving said indication message of IP-CAN session establishment, said home PCRF including a default Policy and Charging Control (PCC) rule made for a user into an IP-CAN session establishment acknowledge message to send to said PCEF.

11. The method of claim 10, further comprising:

after receiving said indication message of IP-CAN session establishment, said home PCRF updating said default QoS rule, and sending the updated default QoS rule to the visited PCRF through said first subsession, and said visited PCRF sending the updated default QoS rule to said BBERF through said first gateway control session.

12. The method of claim 4, wherein the step of establishing the first gateway control session, the Gx session, the S9 session and the first subsession of the S9 session for performing the policy and charging control on said PDN connection comprises:

a BBERF sending an indication message of gateway control session establishment, which includes a user identifier, a PDN identifier and a PDN connection identifier for uniquely identifying said PDN connection, to the visited PCRF so as to establish the first gateway control session;

after receiving the indication message of gateway control session establishment, said visited PCRF sending an indication message of S9 session establishment or an indication message of S9 session modification, which includes said user identifier, said PDN identifier and said PDN connection identifier, to the home PCRF so as to establish the first subsession of the S9 session;

a gateway at which said BBERF resides sending a proxy binding update message, which includes said user identifier, said PDN identifier and said PDN connection identifier, to the gateway at which the PCEF resides;

after receiving the proxy binding update message, said PCEF sending an indication message of IP-CAN session establishment, which includes said user identifier, said PDN identifier and said PDN connection identifier, to said visited PCRF so as to establish the Gx session; and said visited PCRF associating said Gx session with said first gateway control session and said first subsession according to said user identifier, said PDN identifier and said PDN connection identifier.

13. The method of claim 12, further comprising:

after receiving said indication message of IP-CAN session establishment, said visited PCRF sending the indication message of S9 session establishment or the indication message of S9 session modification, which includes said user identifier, said PDN identifier and said PDN connection identifier, to the home PCRF;

after receiving the indication message of S9 session establishment or the indication message of S9 session modification sent by the visited PCRF, said home PCRF including default policies made for a user into an S9 session establishment acknowledge message or an S9 session modification acknowledge message to send to said visited PCRF; and after receiving said S9 session establishment acknowledge message or said S9 session modification acknowledge message, said visited PCRF including a Quality of Service (QoS) rule in said default policies into a gateway control session establishment acknowledge message to send to said BBERF, and including a Policy and Charging Control (PCC) rule in said default policies into an IP-CAN session establishment acknowledge message to send to said PCEF.

\* \* \* \* \*

UNITED STATES PATENT AND TRADEMARK OFFICE
CERTIFICATE OF CORRECTION

Page 1 of 1

PATENT NO. : 9,137,652 B2
APPLICATION NO. : 13/257806
DATED : September 15, 2015
INVENTOR(S) : Xiaoyun Zhou et al.

It is certified that error appears in the above-identified patent and that said Letters Patent is hereby corrected as shown below:

On the title page insert item (30), Foreign Application Priority Data:

| Country | Priority | Priority Date |
|---|---|---|
| --CHINA | 200910152094.3 | 07-28-2009-- |

Signed and Sealed this
Twenty-ninth Day of March, 2016

Michelle K. Lee
*Director of the United States Patent and Trademark Office*